US008379701B2

(12) United States Patent
Lutz

(10) Patent No.: US 8,379,701 B2
(45) Date of Patent: Feb. 19, 2013

(54) HIGH BANDWIDTH DUAL PROGRAMMABLE TRANSMISSION LINE PRE-EMPHASIS METHOD AND CIRCUIT

(75) Inventor: Robert C. Lutz, Sunnyvale, CA (US)

(73) Assignee: Micrel, Inc., San Jose, CA (US)

( * ) Notice: Subject to any disclaimer, the term of this patent is extended or adjusted under 35 U.S.C. 154(b) by 297 days.

(21) Appl. No.: 12/948,263

(22) Filed: Nov. 17, 2010

(65) Prior Publication Data

US 2011/0228824 A1 Sep. 22, 2011

Related U.S. Application Data

(63) Continuation-in-part of application No. 12/725,399, filed on Mar. 16, 2010, now Pat. No. 8,295,336.

(51) Int. Cl.
*H04B 1/38* (2006.01)

(52) U.S. Cl. ......................... 375/222; 375/258; 375/257

(58) Field of Classification Search .................. 375/222, 375/258, 257
See application file for complete search history.

(56) References Cited

U.S. PATENT DOCUMENTS 3,689,752 A * 9/1972 Gilbert .......................... 327/357
4,885,547 A * 12/1989 Bell et al. ...................... 330/254
5,124,673 A * 6/1992 Hershberger ................... 333/18
6,111,463 A * 8/2000 Kimura ......................... 330/254
6,215,816 B1 * 4/2001 Gillespie et al. .............. 375/219
6,580,760 B1 * 6/2003 Larsen .......................... 375/257
6,590,454 B2 * 7/2003 Phanse et al. ................. 330/257
6,642,868 B1 * 11/2003 Brown et al. ................. 341/120
6,724,219 B1 * 4/2004 Kim et al. ...................... 326/30
7,042,952 B1 * 5/2006 Murphy ........................ 375/258
7,126,419 B2 * 10/2006 Miyasita ........................ 330/69
7,280,590 B1 * 10/2007 Boecker et al. ............... 375/219
7,403,041 B2 * 7/2008 Bajdechi et al. ................ 326/86
7,492,827 B2 * 2/2009 Feldtkeller .................... 375/258
7,515,672 B2 * 4/2009 Dupuis et al. ................. 375/377
7,643,563 B2 * 1/2010 Huang et al. .................. 375/257
7,724,815 B1 * 5/2010 Raha et al. .................... 375/230
8,068,537 B2 * 11/2011 Roth ............................ 375/219
8,138,851 B2 * 3/2012 Lutz et al. ................... 333/81 R
8,149,013 B2 * 4/2012 Kao ............................... 326/27
2002/0118732 A1 * 8/2002 Koren .......................... 375/219
2002/0181601 A1 * 12/2002 Huang et al. .................. 375/258
2003/0016091 A1 * 1/2003 Casper ............................ 333/18
2004/0227622 A1 * 11/2004 Giannini et al. ......... 340/310.01
2005/0100104 A1 * 5/2005 Dupuis et al. ................. 375/257
2006/0067396 A1 3/2006 Christensen
2006/0171477 A1 * 8/2006 Carballo et al. .............. 375/257
(Continued)

OTHER PUBLICATIONS

"10.7Gbps Adaptive Receive Equalizer," Maxim MAX3805 Data Sheet, pp. 1-10, Year: 2006.

*Primary Examiner* — Sam K Ahn
*Assistant Examiner* — Santiago Garcia
(74) *Attorney, Agent, or Firm* — Van Pelt, Yi & James LLP

(57) ABSTRACT

In one embodiment, a transmission line pre-emphasis circuit includes a primary signal path generating a primary differential output current indicative of a digital data stream and a secondary signal path including a pulse shaping stage incorporating a network and a scaling stage. The pre-emphasis circuit generates an overshoot pulse with variable pulse width. In another embodiment, a transmission line pre-emphasis circuit includes a primary signal path generating a primary differential output current indicative of a digital data stream and one or more secondary signal paths incorporating a network implementing a specific transient response. Each of the secondary signal paths includes a scaling stage and a shaping stage each with programmable bias current. The scaling stage can be configured before or after the shaping amplifier. The pre-emphasis circuit generates an overshoot signal with variable amplitude and/or variable width.

27 Claims, 27 Drawing Sheets

U.S. PATENT DOCUMENTS

2006/0284728 A1 12/2006 Rubinstein et al.
2007/0014340 A1* 1/2007 McGee .......................... 375/220
2010/0045254 A1* 2/2010 Grant ............................ 323/283
2010/0237910 A1* 9/2010 Mukhopadhyay et al. ... 327/108
2011/0096848 A1* 4/2011 Lam et al. ..................... 375/257
2011/0227675 A1* 9/2011 Lutz et al. ................... 333/28 R
2011/0228824 A1* 9/2011 Lutz .............................. 375/219
2011/0228871 A1* 9/2011 Lutz .............................. 375/295
2012/0001678 A1* 1/2012 Feng ............................. 327/517

* cited by examiner

Wave Shaping Network with Small Bias Current or Large Input Swing
900
Iout
Complex Overshoot Shaping (Amp and Width)
904
906
PG2
Complex Overshoot Width Control
903
905
PG1
Vin
(a)
950
Iout
Complex Overshoot Amplitude Control
954
956
PG2
Complex Overshoot Shaping (Width Control)
953
955
PG1
Vin
(b)
(c)
W
560
Complex Overshoot Width Control
(d)
562
Complex Overshoot Amplitude and Width Control

HIGH BANDWIDTH DUAL PROGRAMMABLE TRANSMISSION LINE PRE-EMPHASIS METHOD AND CIRCUIT

CROSS-REFERENCE TO RELATED APPLICATIONS

This application is a continuation-in-part of application Ser. No. 12/725,399, filed Mar. 16, 2010, entitled "High Bandwidth Programmable Transmission Line Pre-Emphasis Method and Circuit," having at least one common inventor, which application is incorporated herein by reference in its entirety.

This application is related to concurrently filed and commonly assigned U.S. patent application Ser. No. 12/948,362, entitled "High Bandwidth Programmable Transmission Line Pre-Emphasis Method and Circuit" of the same inventor hereof, which application is incorporated herein by reference in its entirety.

FIELD OF THE INVENTION

The invention relates to transmission line pre-emphasis circuit and method and, in particular, to a programmable transmission line pre-emphasis circuit and method for use in high bandwidth applications.

DESCRIPTION OF THE RELATED ART

High digital data rates often mandate using properly terminated, controlled impedance paths, called transmission lines, to maintain data integrity. Transmission lines can include a variety of media, such as coaxial cables, twinax cables, as well as single traces and differential pair traces on a PC board such as striplines, microstrip lines and coplanar waveguides. Most of these media exhibit signal loss as the data signal is transmitted over the length of the transmission line and that signal loss increases with line length and signal harmonic frequencies. That is, the higher frequency components of the data signal being carried is more susceptible to signal loss for long line length. Because the high frequency components of a digital bit stream defines the transition edges of the data signal, losing the high frequency components of the data signal results in distortion. Severe distortion can introduce errors into the received bit stream.

A transmission line equalizer is employed as an end-of-line receiver to selectively boost the higher signal harmonics or higher frequency components of the signal to compensate for frequency dependent losses, thus helping to restore the digital bit stream to the original data stream. In some instances, the limit of equalization is reached and equalization alone cannot fully recover the original data stream and other compensation methods are desired. Pre-emphasis is one method of compensation wherein the signal to be transmitted is modified at the driver end so that the signal includes signal transitions designed to overshoot in a controlled fashion. In practice, pre-emphasis works by boosting the higher frequency components that are going to be attenuated at the receiver end of the transmission line. In this manner, the frequency components that are susceptible to signal loss are strengthened before the digital bit stream is transmitted down the transmission line. Though pre-emphasis exaggerates and distorts signals at the driver end, proper implementations improve signal readability at the receiver end of the transmission line.

SUMMARY OF THE INVENTION

According to one embodiment of the present invention, a transmission line pre-emphasis circuit includes a primary signal path coupled to receive a digital data stream to be transmitted and provide a primary differential output current indicative of the digital data stream, one or more secondary signal paths each incorporating a network implementing a specific transient response where the one or more secondary signal paths receive the digital data stream and generate secondary differential output currents representing one or more overshoot signals indicative of the transient response of the respective network and synchronized with transitions of the digital data stream. The one or more secondary signal paths receive a pair of programmable bias currents that vary an amplitude and/or a width of the one or more overshoot signals. The secondary differential output currents are summed with the primary output current of the primary signal path. The transmission line pre-emphasis circuit further includes an output loading stage coupled to receive the summed current to generate a pre-emphasized digital output signal indicative of the one or more overshoot signals added to and synchronized with transitions of the digital data stream.

According to another embodiment of the present invention, a method for introducing pre-emphasis to a digital data stream being transmitted over a transmission line includes generating a primary output current indicative of the digital data stream, applying the digital data stream to one or more networks where each network has a specific transient response, generating secondary output currents representing one or more overshoot signals indicative of the transient response of the respective network and synchronized with transitions of the digital data stream, adjusting bias currents of each secondary output current through a pair of DC programming signals at each of the one or more secondary signal path where the bias currents are adjusted to vary an amplitude and/or a width of the one or more overshoot signals, summing the primary output current with the secondary output current representing the one or more overshoot signals, and generating a pre-emphasized digital output signal based on the summed current where the pre-emphasized digital output signal being indicative of the one or more overshoot signals added to the digital data stream.

The present invention is better understood upon consideration of the detailed description below and the accompanying drawings.

DETAILED DESCRIPTION OF THE PREFERRED EMBODIMENTS

Figure 1:
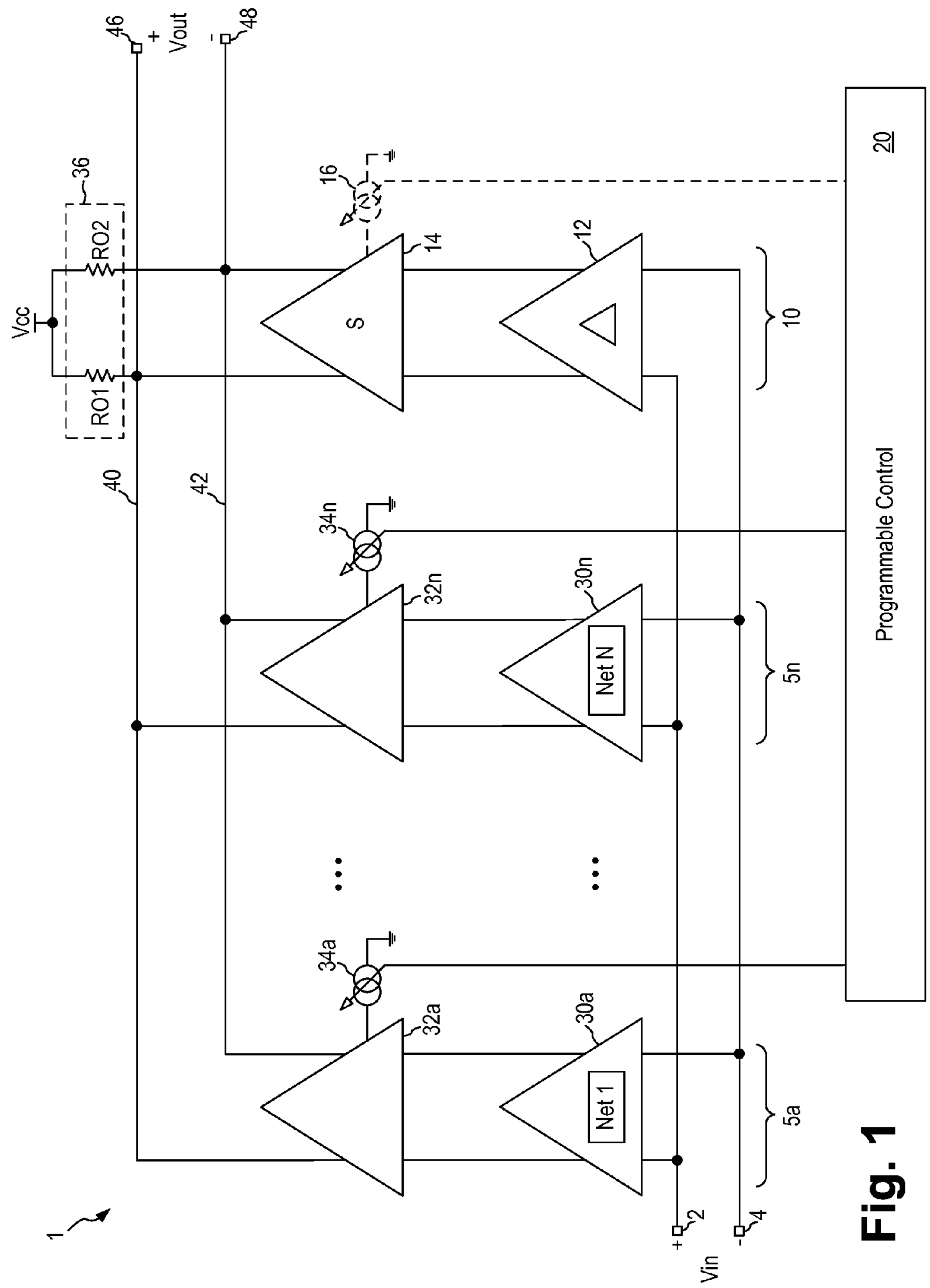
FIG. 1 is a schematic diagram of a transmission line pre-emphasis circuit according to a first embodiment of the present invention.

In accordance with the principles of the present invention, a transmission line pre-emphasis circuit includes a primary signal path providing switched currents indicative of the digital data stream to be transmitted and one or more secondary signal paths generating overshoot signals which are added to the output signal of the primary signal path to generate a pre-emphasized digital output signal to be transmitted on the transmission line. The overshoot signals can be in the form of a variable amplitude decaying exponential waveform with a predetermined time constant or a pulse with fixed or variable amplitude and pulse width or a complex overshoot waveform or other suitable waveforms having desired compensation characteristics. The transmission line pre-emphasis circuit of the present invention provides a flexible, systematic method of adding pre-emphasis, also referred to as controlled overshoot, to high speed differential or single-ended transmission line drivers.

Furthermore, the transmission line pre-emphasis circuit is implemented with programmable control to facilitate easy adjustment of the pre-emphasis amplitude and wave shape via common analog or digital programming techniques. In this manner, the transmission line pre-emphasis circuit of the present invention enables a single integrated circuit design to address a variety of transmission media with different signal loss characteristics by "programming" the pre-emphasis to match line loss characteristics of the different kinds of transmission media. Programmability can be achieved by setting DC bias currents via an analog technique (on-chip and/or off-chip resistors) or via one of many digital techniques.

In some embodiments, the transmission line pre-emphasis circuit of the present invention incorporates multiple DC programmable secondary signal paths, each secondary signal paths being formed using a simple network. In this manner, a variety of controlled overshoot signals having the desired compensation characteristics can be generated by mixing the desired amount of overshoot signal from each secondary signal path. Furthermore, in other embodiments, the secondary signal path is implemented with dual programmability to enable programming of both the shape (or width) and the amplitude of the overshoot signal. Further flexibility is realized by the dual programmable implementation to allow even greater control over the overshoot signal waveform.

The transmission line pre-emphasis circuit of the present invention modifies the shape of the transmitted signal so as to improve the quality of the received bit stream at the far end of the transmission line. When signal reception is improved, the cable length between two terminal points can be increased to eliminate the need for a repeater. In other words, when pre-emphasis is applied, the cable length can be increased so that the cable distance between two terminal points is increased before a repeater is needed. Eliminating or reducing the deployment of repeaters reduces system cost.

FIG. 1 is a schematic diagram of a transmission line pre-emphasis circuit according to a first embodiment of the present invention. Referring to FIG. 1, a transmission line pre-emphasis circuit 1 ("pre-emphasis circuit 1") receives a differential digital input signal Vin on a pair of differential input terminals 2, 4. Digital input signal Vin represents the digital data stream to be transmitted onto the transmission line. Input signal Vin is a digital bit stream with fast rise and fall time and may be described as a series of step functions that comprise a digital bit stream. Transmission line pre-emphasis circuit 1 generates a pre-emphasized differential output signal Vout on a pair of differential output terminals 46, 48. Transmission line pre-emphasis circuit 1 includes a primary signal path 10 for passing the digital input signal Vin and one or more secondary signal paths 5*a* to 5*n*. Each of the secondary signal paths incorporates one or more unique networks (Net 1 to Net N) to implement specific transient responses for the secondary signal path to allow pre-emphasis circuit 1 to address a variety of transmission media.

More specifically, the primary signal path 10 and the one or more secondary signal paths 5*a*-5*n* operate in parallel to generate the final pre-emphasized output signal Vout. In the present embodiment, each of the primary signal path and the one or more secondary signal paths includes two differential stages connected in series. The delays through all of the parallel signal paths are matched. The first differential stage in each of the parallel signal paths is driven in common by the differential input voltage Vin and the second differential stage in each of the parallel signal paths generates differential output currents. The differential output currents from all of the signal paths are summed at a pair of current summing nodes 40, 42 which is connected to a loading circuit 36 to generate the differential output voltage Vout on output nodes 46, 48. The differential output voltage Vout thus reflects the sum of the differential output currents from all signal paths. In the present embodiment, loading circuit 36 is implemented using a set of load resistors RO1 and RO2. In other embodiments, the loading circuit 36 may also include common base transistors to enhance the signal bandwidth. The use of loading resistors is illustrative only and is not intended to be limiting.

Primary data path 10 includes a differential digital driver 12 and a current switch 14 driving switched current onto the current summing nodes 40, 42. More specifically, digital driver 12 receives the differential input signal Vin on its differential input terminals. The differential output signal from digital driver 12 in turn drives current switch 14 which switches its differential output current on and off with negligible overshoot. The differential switched current from current switch 14, also referred to as the primary path output current, drives current summing nodes 40, 42. Load resistors RO1 and RO2, connected between the positive power supply voltage Vcc and a respective one of the current summing nodes 40, 42, convert the current on current summing nodes 40, 42 into the differential output voltage Vout on output nodes 46, 48, the differential output voltage being the pre-emphasized output signal.

In operation, primary signal path 10 generates a differential output current signal that mimics the digital input signal having fast rising and falling edges. In essence, primary signal path 10 passes the digital input signal Vin with matching delay and with optional amplification. In some embodiments, current switch 14 receives a programmable bias current from a current source 16. The programmable bias current from current source 16 functions to adjust the output amplitude of the primary path output current. Current source 16 is controlled by a DC programming signal from a programmable control block 20. The programmability of the bias currents in pre-emphasis circuit 1 will be described in more detail below. The use of programmable current source 16 is optional and may be omitted in other embodiments of the present invention.

In primary signal path 10, differential digital driver 12 serves two primary functions. Driver 12 provides a low impedance output for driving current switch 14. Driver 12 also serves to provide the necessary delay in the signal path to match the delay of the secondary signal paths. Ideal pre-emphasis requires that the overshoot and the primary switch output current edges should occur simultaneously. Therefore, it is necessary that the overshoot signals generated by the secondary signal paths occur at the same time as the primary switch output current provided by the primary signal path. In one embodiment, driver 12 is constructed using matching circuitry as the first stage circuitry in the secondary signal paths to ensure matching delay.

In pre-emphasis circuit 1, overshoot signals are generated by the one or more secondary signal paths 5*a*-5*n* which operate in parallel with the primary signal path 10. In the present embodiment, each secondary signal path 5*a-n* includes a first stage amplifier 30*a-n* implementing a wave shaping function and a second stage amplifier 32*a-n* providing signal amplification. The first stage amplifiers 30*a-n* are driven in common by the differential input voltage Vin. The second stage amplifiers 32*a-n* receive the overshoot signals (also referred to as "wave shaping signals") from the respective first stage amplifiers 30*a-n* and generate second stage differential output currents each having a specific transient response. Thus, the shape and magnitude of each secondary path output current are determined primarily by the first stage wave shaping network and the second stage gain respectively. The differential output currents of all secondary signal paths 5*a-n* are summed at the current summing nodes 40, 42 and drive the loading circuit 36 including load resistors RO1 and RO2. The secondary signal paths 5*a-n* generate various transient responses which are added to the digital input signal passed by the primary signal path 10.

In the present embodiment, a simple, fixed network (Net 1 to Net N) is embedded within each of the first stage amplifiers 30*a-n* to generate a specific transient response for that secondary signal path. The network in each secondary signal path determines the overshoot amplitude and shape or the time constant of the transient response to be generated. The transient response and the network implementing the transient response thereof can include a response with a specific time constant (serial connection of a resistor and a capacitor), or an overshoot pulse (a single capacitor). The advantage of the networks used in the signal paths of pre-emphasis circuit 1 is that only very simple network is needed to select the desired transient response. In some embodiments, each network includes only one or two passive electrical components, such as resistors and/or capacitors.

In secondary signal paths 5*a*-5*n*, second stage amplifiers 32*a-n* provide amplification of the overshoot signals generated by the first stage amplifiers 30*a-n*. According to embodiments of the present invention, the gain of each of the second stage amplifiers 32*a-n* is set by a DC programming signal. More specifically, the current gain of each of the second stage amplifiers is set by a DC bias current provided by a programmable current source controlled by a DC programming signal. Accordingly, transmission line pre-emphasis circuit 1 realizes programmability of the overshoot signal by implementing programmable current gain at the second stage amplifiers 32*a* to 32*n*. Programmable current gain can also be implemented at current switch 14 in the primary signal path 10, as described above. As described above, programmable current gain in the primary signal path 10 is optional and may be omitted in other embodiments of the present invention.

More specifically, each second stage amplifier 32a-32n receives a programmable bias current from a respective current source 34a-n and current switch 14 receives programmable bias current from current source 16. Current sources 16, 34a to 34n are controlled by programmable control block 20 to set the desired magnitude of the bias current applied to the primary signal path 10 and each secondary signal path 5a-n, thereby adjusting the gain for each signal path. In operation, the small signal current gain of the second stage amplifiers and the magnitude of switched currents are proportional to the magnitude of the respective applied bias currents. Hence, varying values of the DC bias current provided by current sources 16, 34a-n vary the gain of the signal paths and thereby also vary the amplitude of the primary output current and the relative proportions of the overshoot signals generated at each secondary signal paths that are summed at current summing nodes 40, 42. The overshoot or wave shaping signals can be precisely tailored by adjusting the magnitudes of each secondary signal path individually to obtain the desired pre-emphasized output signal.

Programmable control block 20 can be implemented using a variety of DC programming techniques presently known or to be developed. In one embodiment, the programming of the DC bias current is through a set of resistors, one for each signal path to be programmed. These resistors directly or indirectly determine the level of the tail currents supplying the second stage amplifiers and the current switch. These resistors are typically off-chip (i.e. not on the same integrated circuit as the transmission line pre-emphasis circuit). In other embodiments, the programming of the DC bias currents is accomplished by other means. On-chip resistors can be used to set a fixed gain value for a non-programmable signal path. Programmable bias currents may also be determined via on-chip digital-to-analog converters wherein the digital programming data is loaded to the pre-emphasis circuit chip and retained in some form of volatile or non-volatile storage elements. Other programming means include (but are not limited to) registers, reprogrammable cells such as flash or EPROM, and non-reprogrammable cells, such as fuses, anti-fuses, "zapped" Zener diodes, any of which may be programmed via well-known techniques.

In pre-emphasis circuit 1, the unique network incorporated in each secondary signal path generates the desired shape of the transient response for that signal path. The programmable bias currents applied to the second stage amplifiers 34a-n allow the amplitudes of the specific transient response of each secondary signal path to be individually tailored. When the transient responses are combined synchronously with the primary path output signal, a pre-emphasis output signal Vout with controlled overshoot at each signal transition is obtained. With a reasonable selection of networks, one pre-emphasis circuit design in accordance with the present invention can be used to effectively compensate for large classes of transmission line losses that typically vary with transmission line length and material properties. The pre-emphasis circuit of the present invention represents a marked improvement over conventional pre-emphasis circuits where compensation can only be optimized for a limited class of transmission lines.

In the above-described embodiment, the transmission line pre-emphasis circuit 1 is configured for differential signaling. In other embodiments, transmission line pre-emphasis circuit 1 can be configured for single-ended input signals by connecting the single ended signal to one digital input terminal (2 or 4) and connecting the other digital input terminal to a fixed voltage with a value between the high and low signal levels. Single ended output signals are, of course, available in both true and inverted forms at the respective output terminals 46 and 48.

Figure 2:
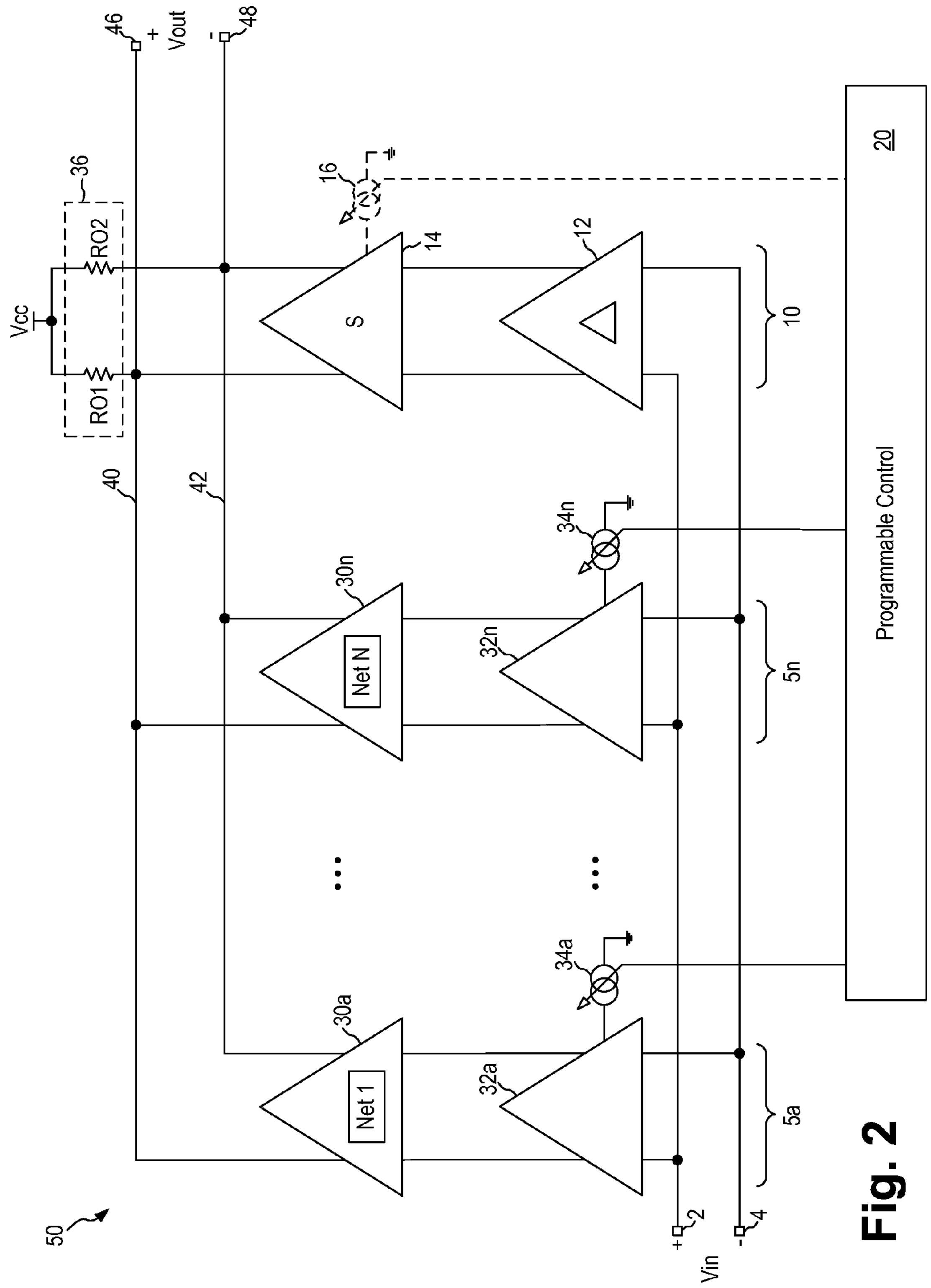
FIG. 2 is a schematic diagram of a transmission line pre-emphasis circuit according to a second embodiment of the present invention.

In the pre-emphasis circuit shown in FIG. 1, the secondary signal paths are constructed using the first stage amplifiers as the wave shaping stage and the second stage amplifiers as the gain stage or amplification stage. In other embodiments, the arrangement of the wave shaping stage and the gain stage can be varied. FIG. 2 is a schematic diagram of a transmission line pre-emphasis circuit according to a second embodiment of the present invention. Referring to FIG. 2, transmission line pre-emphasis circuit 50 is constructed in a similar manner as pre-emphasis circuit 1 of FIG. 1. In transmission line pre-emphasis circuit 50, the first stage amplifiers 32a-n are implemented as gain stages and the second stage amplifiers 30a-n are implemented as wave shaping stages. Similar to pre-emphasis circuit 1, pre-emphasis circuit 50 generates a pre-emphasis output voltage incorporating transient responses created by the unique networks Net 1 to Net N.

In the present description, a "gain stage" refers to a stage that implements amplitude modification or scaling. That is, a gain stage described herein includes a stage the receives an input voltage or an input current and generate a scaled output voltage or an output current. The input and output signals to the gain stage may be either one of a voltage or a current and does not have to be the same signal type. Furthermore, the gain stage described herein may function as a scaling stage and may be implemented as an amplifier or a switch.

In the embodiments shown in FIGS. 1 and 2, the secondary signal paths in the respective pre-emphasis circuits are constructed in a similar manner. The secondary signal paths in a pre-emphasis circuit are constructed with all gain stage first or all gain stage last. The specific arrangement of gain and wave shaping stages shown in FIGS. 1 and 2 is illustrative only and not intended to be limiting. In other embodiments, a transmission line pre-emphasis circuit can be formed using a combination of secondary signal paths, some with the gain stage first and the wave shaping stage last and some with the wave shaping stage first and the gain stage last.

Figure 3:
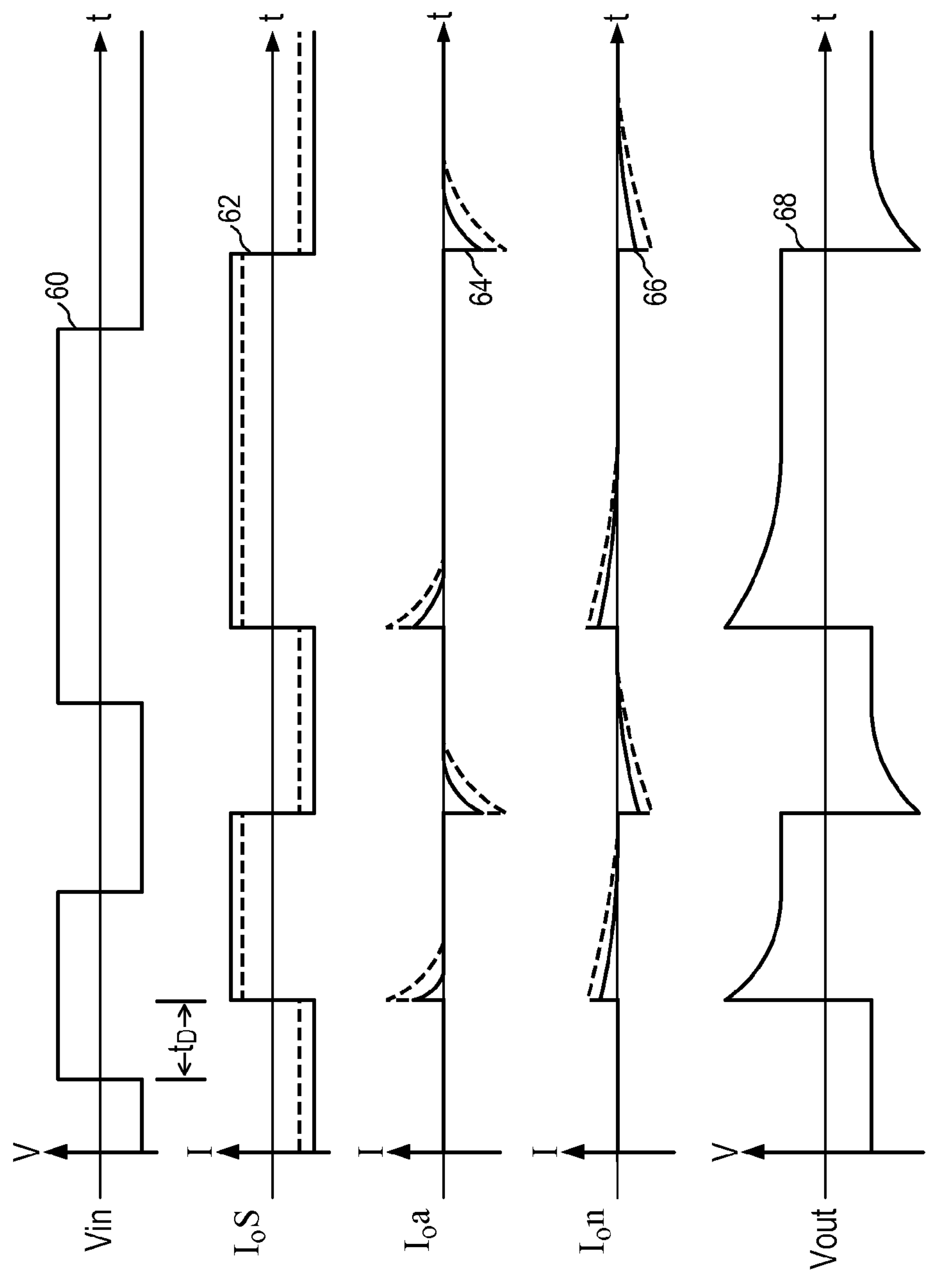
FIG. 3 illustrates the signal waveforms from the pre-emphasis circuit of FIG. 1 or 2 according to embodiments of the present invention.

FIG. 3 illustrates the signal waveforms from the pre-emphasis circuit of FIG. 1 or 2 according to embodiments of the present invention. Referring to FIG. 3, the digital input voltage Vin (curve 60) is a digital bit stream with fast transitions, that is, fast rising and falling edges. The primary path output current $I_oS$ (curve 62) from current switch 14 is basically a delayed version of the input voltage Vin. In the present illustration, the propagation delay through the primary or secondary signal path is denoted as $t_D$. As described above, all the signal paths are configured to have the same propagation delay so that the transient responses can be added synchronously to the rising and falling edges of the input signal Vin. The primary signal path functions as a buffer, transferring only edge timing information to the current summing nodes. That is, the output DC levels and edge speeds of the primary path output current are reestablished within the primary signal path and not transferred from the input through the output of the primary signal path. The amplitude of the primary path output current (curve 62) can be adjusted by providing a programmable bias current through current source 16. In FIG. 3, the dashed line represents a different amplitude to which the primary signal path output current can be programmed.

In FIG. 3, two exemplary secondary path differential output currents $I_oa$ (curve 64) and $I_on$ (curve 66) are shown. Current $I_oa$ (curve 64) exemplifies a secondary signal path incorporating a network with a relatively fast time constant or fast exponential decay. Thus, each transition of current $I_oa$ has a fast current spike that decays quickly. Current $I_o n$ (curve 66), on the other hand, exemplifies a secondary signal path incorporating a network with a long time constant or slow exponential decay. Thus, each transition of current $I_o n$ has a current spike that decays slowly over time. Again, the dashed line for each output current represents a different amplitude to which the secondary signal path can be programmed using programming bias currents. The amplitude of the output current is modified by adjusting the gain of the gain stage through providing the appropriate programming bias current. However, the secondary path time constants are fixed by the network used in the wave shaping stage.

In operation, a broad range of different single or multiple time constant responses may be approximated by summing the output current signal of the primary signal path with varying proportions of output currents from the multiple secondary signal paths. More specifically, the primary path output current $I_o S$ and the secondary path output currents ($I_o a$ and $I_o n$) are combined at the current summing nodes and converted to a differential output voltage Vout (curve 68) at the loading circuit. In sum, the individual transient current response of each secondary signal path reflect the current resulting from the application of input signal Vin to the embedded network as scaled by the gain setting of that signal path. Relative proportions of the transient current responses from each secondary signal path are summed and added to the output current signal of the primary signal path to yield the pre-emphasized output signal Vout. In this manner, adequate compensation for a wide range of transmission line loss characteristics can be achieved using the pre-emphasis circuit of the present invention with only a few secondary path circuits having their amplitude properly adjusted via programming. Accordingly, curve 68 in FIG. 3 represents one of an infinity number of pre-emphasis compensation profiles that could be achieved by the same pre-emphasis circuit.

It is imperative to note that the overshoot signal generated as the transient response from each secondary signal path should decay to near zero or should terminate before the end of the single data bit period. The single data bit period refers to the shortest time between data transitions. In this manner, the overshoot signal generated for the purpose of pre-emphasis will not interfere with succeeding data bits.

Figure 4:
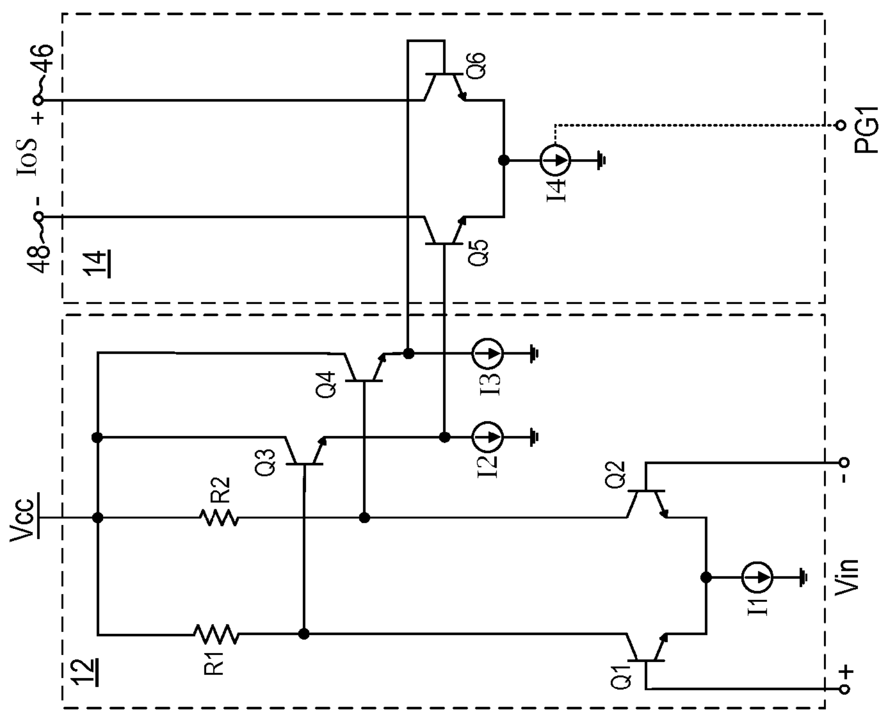
FIG. 4 is a transistor level circuit diagram of the primary signal path according to one embodiment of the present invention.

FIG. 4 is a transistor level circuit diagram of the primary signal path according to one embodiment of the present invention. Referring to FIG. 4, driver 12 is formed by a digital buffer or a voltage amplifier transistors Q1 and Q2 and loading resistors R1 and R2. Driver 12 is used to match the total primary signal path delay to the secondary signal path delays. Driver 12 also provides a low impedance drive to the current switch 14 formed as a differential pair including transistors Q5 and Q6. Current switch 14 is implemented as a saturating transconductance amplifier operative to receive the voltage output signals from digital buffer 12 and generate output currents on output nodes 46 and 48. Current source I4 driving the current switch 14 can be a fixed current source or a programmable current source controlled by a programming signal PG1. In the present embodiment, the primary signal path 70 is constructed using bipolar transistors. In other embodiments, the primary signal path can be constructed using other devices, such as MOS transistors.

Figure 5:
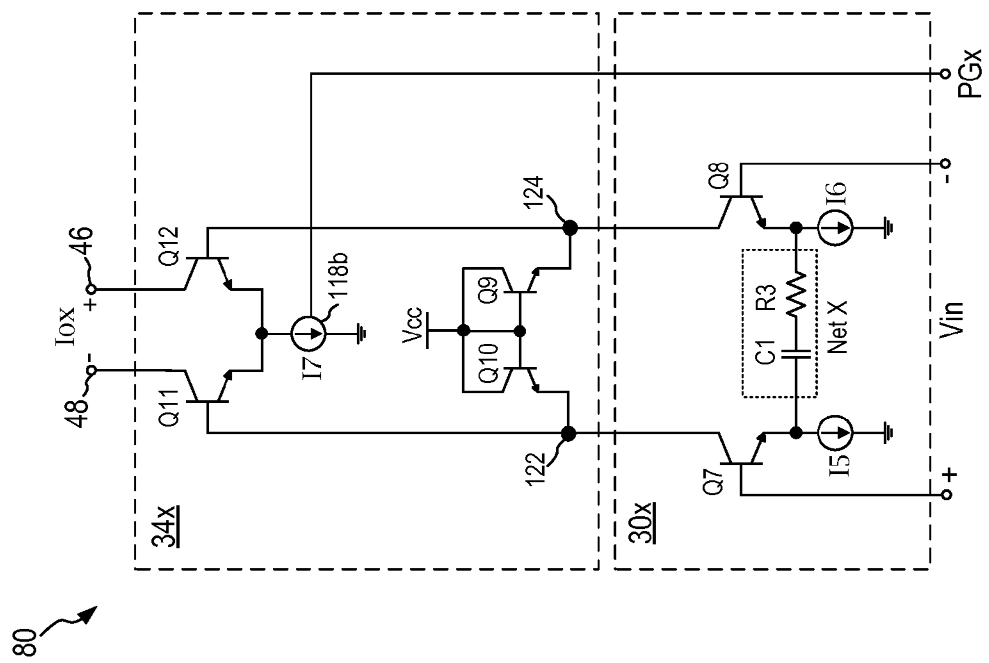
FIG. 5 is a transistor level circuit diagram of an exemplary secondary signal path according to one embodiment of the present invention.

FIG. 5 is a transistor level circuit diagram of an exemplary secondary signal path according to one embodiment of the present invention. Referring to FIG. 5, secondary signal path 80 is constructed with the wave shaping stage 30*x* first and gain stage 34*x* last. In the wave shaping stage 30*x*, transistors Q7 and Q8 form a differential amplifier. A network Net X is embedded at the emitter terminals of transistors Q7 and Q8 to provide the desired transient response. In the present illustration, a network including a capacitor C1 connected in series with a resistor R3 is used. The capacitance and resistance values of capacitor C1 and resistor R3 are chosen to determine the overshoot time constant for the signal path. Transistors Q7 and Q8 generate a differential output current at their collector terminals 122, 124. Wave shaping stage 30*x* is thus a transconductance amplifier, receiving an input voltage Vin and generating output currents on terminals 122, 124.

In the present embodiment, gain stage 34*x* is implemented as a variable gain current amplifier. In particular, in the present embodiment, gain stage 34*x* is implemented as a Gilbert gain cell. The Gilbert gain cell and multiplier is described in U.S. Pat. No. 3,689,752, to Barrie Gilbert. Characteristics of the Gilbert gain cell include differential amplifier techniques wherein linear-to-nonlinear and compensating nonlinear-to-linear signal transformations and current amplification are employed to minimize signal voltage amplitude and preserve high bandwidth. Due to inherent input to output capacitances, most transistors, including bipolar transistors, exhibit higher frequency capability in current amplification modes where the output terminal (collector) voltage is not allowed to move very much. Hence, Gilbert gain cell circuitry provides superior high frequency response capability for the present application.

A salient feature of the Gilbert gain cell is that the Gilbert amplifiers generally have the capability of responding as fast or faster than any other circuit elements built using the same semiconductor technology. Incorporation of the Gilbert gain cell concepts within the present invention assures adequate pre-emphasis performance can be realized for all data rates that might be driven using the same semiconductor technology. This is an important advantage for transceiver applications, where both data stream driver and receiver coexist on the same chip. Lastly, these advantages apply within most common semiconductor technologies including MOS, CMOS, etc., and are not limited to bipolar technologies.

Another feature of the Gilbert gain cell is the use of nonlinear loading. Bipolar and MOS transistors are not linear devices. Specifically, device transconductance ("voltage in to current out") characteristics are nonlinear. For bipolar transistors, the base-to-emitter input voltage and collector output current dynamics are exponentially related. For MOS transistors, the gate-source input voltage to drain output current characteristic is basically a square law relationship. In a Gilbert gain cell, to linearize the output of the transistors, a nonlinear load having the opposite or inverse nonlinear characteristics is coupled to the input of the amplifier to cancel out the inherent nonlinearity of the transistors. For example, when the output current at the amplifier is proportional to the exponential of the input voltage, then a load formed of diodes wherein the voltage across the load varies logarithmically with the current applied to this load. The logarithmic relationship at the input nodes cancels out the exponential characteristic at the output nodes and a linear current amplifier is obtained. As thus constructed, linear current gain amplification can be realized. By using a nonlinear load that has the inverse I-V characteristics of the transistor transconductance characteristic, linear current amplification is achieved.

In gain stage 34*x*, transistors Q9 and Q10 are diode-connected and serve as non-linear load elements for the output currents generated by the wave shaping stage 30*x*. More specifically, the non-linearity of transistors Q9 and Q10 is the inverse of the non-linear input-voltage-to-output-current characteristics of the differential pair formed by transistors Q11 and Q12. As a result, the non-linearities cancel each other and the gain stage 34*x* of the secondary signal path 80 including transistors Q9, Q10 Q11 and Q12 is a linear current amplifier. The gain of the linear current amplifier is set by the bias current I7 provided by a current source 118*b*. The bias current I7 can be varied through a programming signal PGx to vary the gain of the gain stage and the signal path. By adjusting the bias current I7 through programming signal PGx, varying proportion of the transient response can be introduced to the output voltage of the pre-emphasis circuit.

Figure 6:
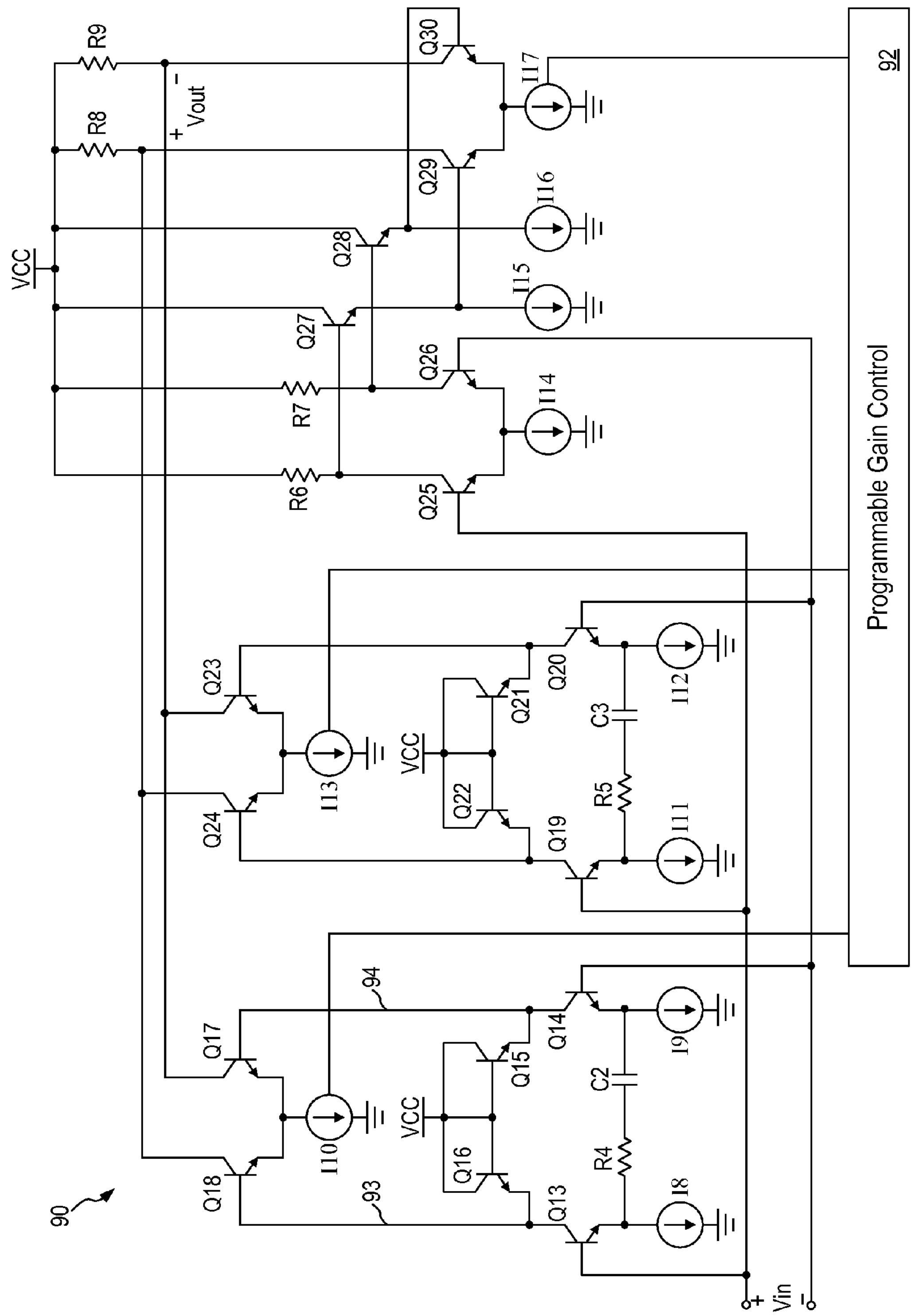
FIG. 6 is a transistor level circuit diagram of the transmission line pre-emphasis circuit of FIG. 1 according to one embodiment of the present invention.

FIG. 6 is a transistor level circuit diagram of the transmission line pre-emphasis circuit of FIG. 1 according to one embodiment of the present invention. In the embodiment shown in FIG. 6, a pre-emphasis circuit 90 includes a primary signal path and two secondary signal paths configured with the wave shaping stage first. The primary signal path includes a differential buffer formed by transistors Q25 and Q26 as the digital driver and a saturating differential amplifier formed by transistors Q29 and Q30 as the current switch. The magnitude of the switched current is programmable through programmable bias current I17.

The first secondary signal path includes a differential amplifier formed by transistors Q13 and Q14 with an embedded network formed by a resistor R4 and a capacitor C2 as the wave shaping stage. The first secondary signal path further includes a gain stage formed by non-linear loading transistors Q15 and Q16 and a differential pair formed by transistors Q17 and Q18. The current gain of the gain stage is programmable through programmable bias current I10.

The second secondary signal path includes a differential amplifier formed by transistors Q19 and Q20 with an embedded network formed by a resistor R5 and a capacitor C3 as the wave shaping stage. The second secondary signal path further includes a gain stage formed by non-linear loading transistors Q21 and Q22 and a differential pair formed by transistors Q23 and Q24. The current gain of the gain stage is programmable through programmable bias current I13.

In pre-emphasis circuit 90, the first secondary signal path and the second secondary signal path provide transient responses having different time constants. In other words, the time constant realized by the network embedded in each of the secondary signal paths is unique. Thus, the time constant R4*C2 is different from the time constant R5*C3. The mixing of different proportions of the different transient responses realizes flexibility to allow the pre-emphasis circuit to address many different applications having different transmission line loss characteristics.

Figure 7:
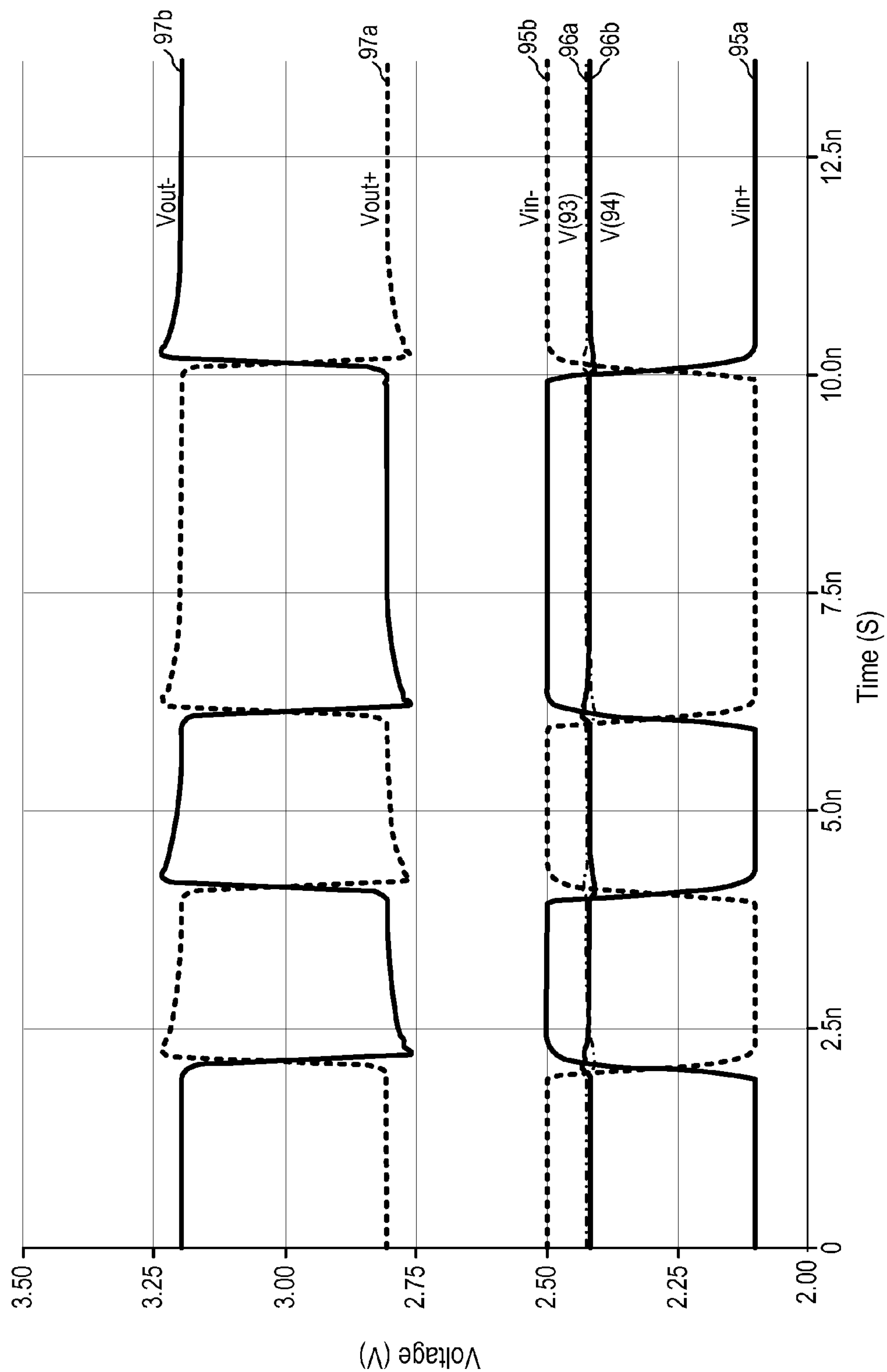
FIG. 7 is a waveform diagram of voltage signals in the pre-emphasis circuit of FIG. 6.

FIG. 7 is a waveform diagram of voltage signals in the pre-emphasis circuit of FIG. 6. Referring to FIG. 7, the differential input signal is shown as the positive input voltage Vin+ (curve 95*a*) and the negative input voltage Vin− (curve 95*b*). The differential output signal at nodes 93, 94 (curves 96*a*, 96*b*) generated by the wave shaping stage of the first secondary signal path includes signal transients that coincide with the transitions (rising and falling) edges of the input voltage. The differential output signal at nodes 93, 94 represents very small, non-linear interstage voltage swings that help assure that high bandwidth of operation is preserved. The resulting differential output voltage is shown as the positive output voltage Vout+ (curve 97*a*) and negative output voltage Vout− (curve 97*b*). As a result of the wave shaping stages of the two secondary signal paths, the rising and falling edges of the output voltages are boosted with controlled overshoot.

Figure 8:
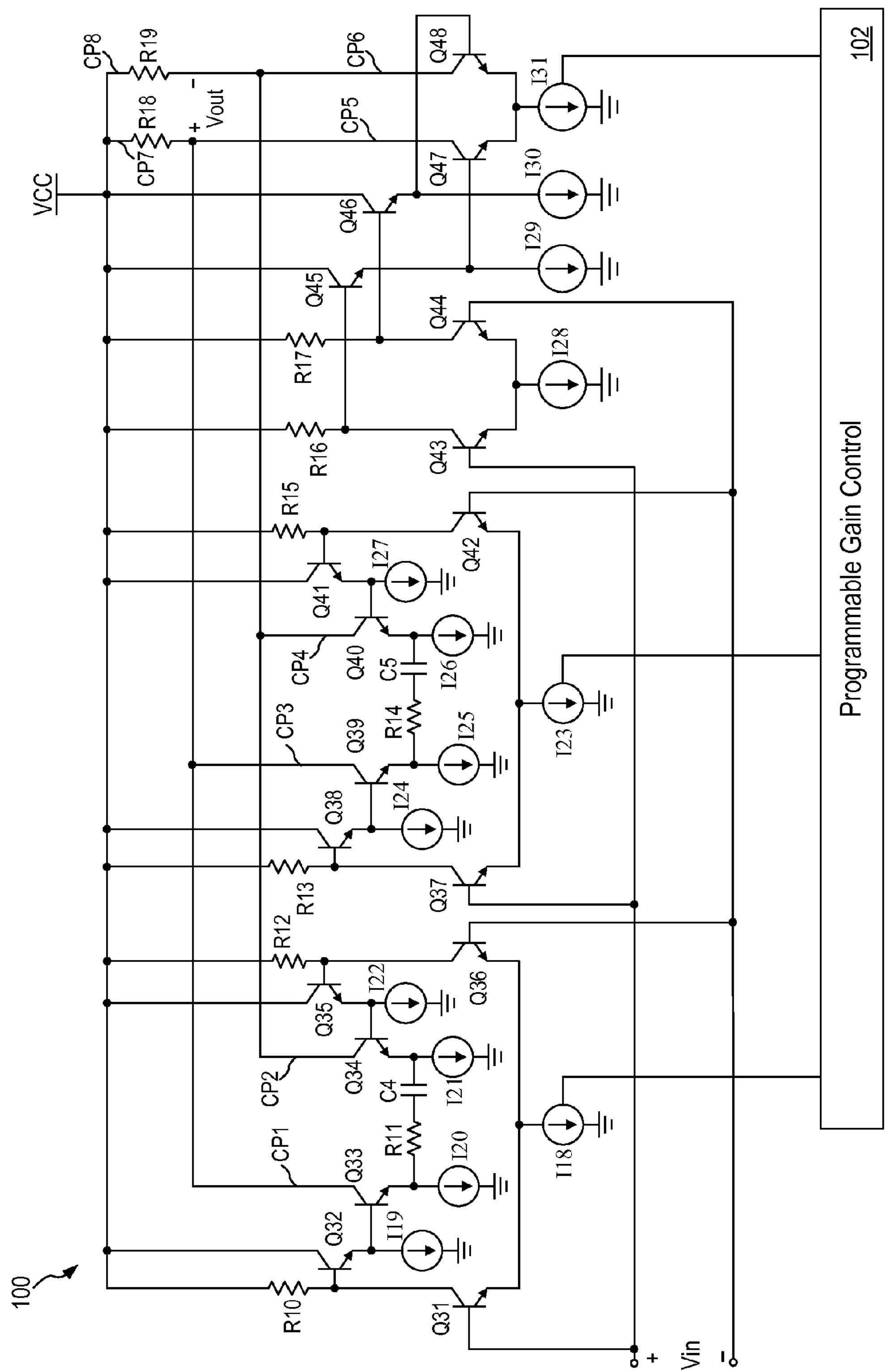
FIG. 8 is a transistor level circuit diagram of the transmission line pre-emphasis circuit of FIG. 2 according to one embodiment of the present invention.

FIG. 8 is a transistor level circuit diagram of the transmission line pre-emphasis circuit of FIG. 2 according to one embodiment of the present invention. Referring to FIG. 8, pre-emphasis circuit 100 is constructed in a similar manner as pre-emphasis circuit 90 of FIG. 7 except that in each of the two secondary signal paths, the gain stage is provided before the wave shaping stage. More specifically, the gain stages in pre-emphasis circuit 100 functions as scaling stages operative to scale the output signal of the wave shaping stages that follow.

In the first secondary signal path, the gain (scaling) stage is formed by transistors Q31 and Q36 as the differential pair and resistors R10 and R12 serve as the linear loads for transistors Q31 and Q36. As a result, the gain stage behaves as a "voltage in, voltage out" linear voltage amplifier when the input signal is a step function. In operation, the differential voltage swing Vin is large enough to cause one transistor of the pair (transistors Q31 and Q36) to switch off while the other transistor conducts the entire tail current I18. That is, the scaling stage switches programmable tail current I18 to its output terminals where the programmable tail current I18 operates to scale (or determine the amplitude of) the transient response of the secondary signal path. The differential output voltage at the collector terminals of transistors Q31 and Q36 varies with the magnitude of the programmable current I18. In other embodiments, the gain (scaling) stage may be implemented using a variable gain amplifier or other suitable amplification circuitry.

The first secondary signal path further includes a wave shaping stage formed by transistors Q33 and Q34 functioning as a "voltage in, current out" transconductance amplifier. The wave shaping stage is embedded with a network including a resistor R11 and a capacitor C4 for shaping the transient response of the signal path. Resistor R11 and capacitor C4 define the time constant provided by the first secondary signal path.

The second secondary signal path is similarly constructed. Transistors Q37 and Q42 with resistors R13 and R15 function as the gain (scaling) stage while transistors Q39 and Q40 function as the wave shaping stage. The gain of the gain stage is programmably adjusted by current source I23. The second secondary signal path is embedded with a network formed by a resistor R14 and a capacitor C5. Resistor R14 and capacitor C5 define the time constant of the transient response provided by the second secondary signal path.

In pre-emphasis circuit 100, the resistance and capacitance values of the two networks are chosen to realize different transient responses to provide flexibility in deriving the desired pre-emphasis to the input signal Vin for the class of pre-emphasis tasks under consideration. Programming signals providing by a programmable gain control block 102 control the programmable bias currents I18, I23 and I31. Bias currents I18, I23 and I31 are adjusted to select the relative proportions of transient responses and primary signal to be summed at the summing node. As a result, an output signal Vout having the desired controlled overshoots is generated.

Figure 9:
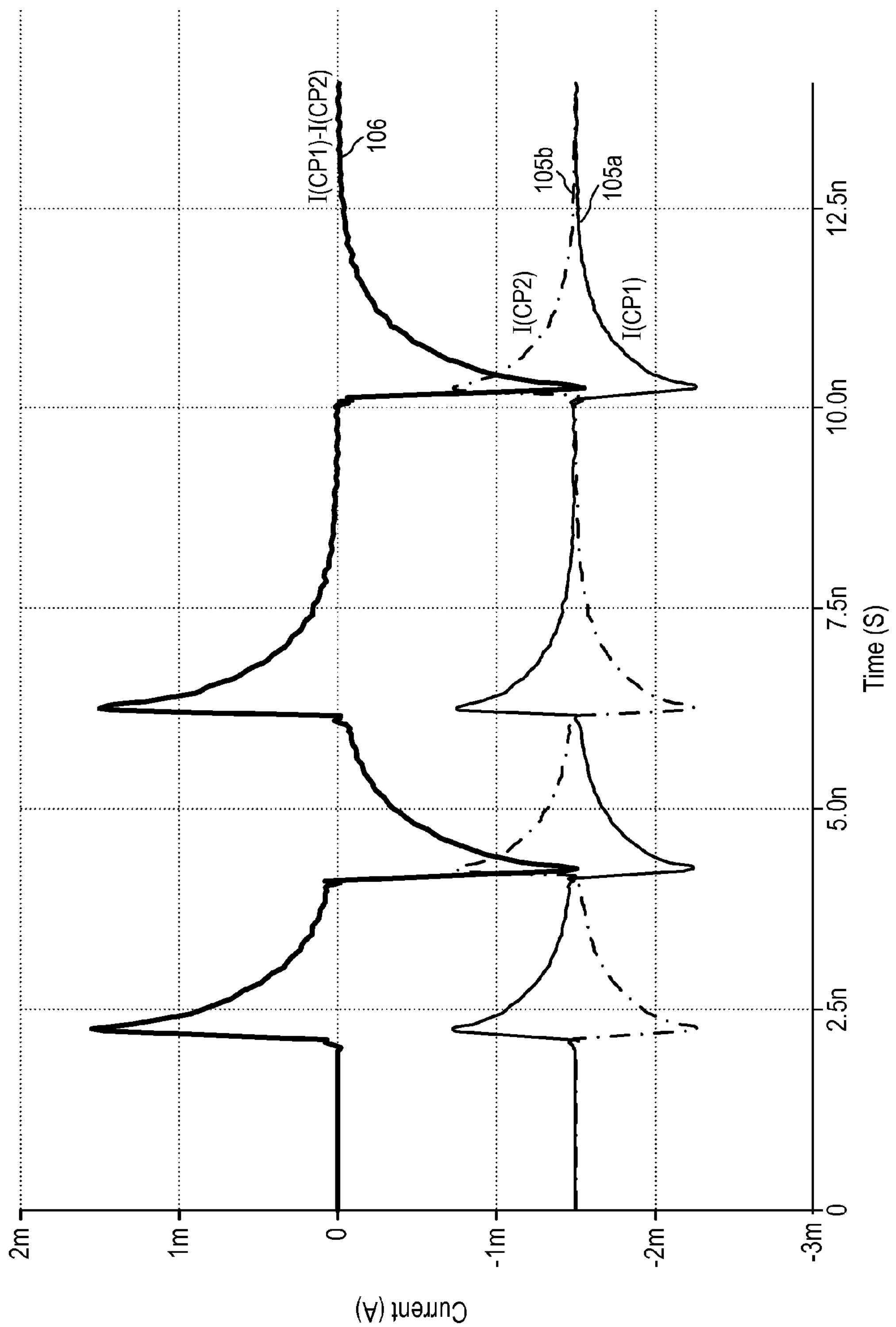
FIGS. 9-11 are waveform diagrams of signals in the pre-emphasis circuit of FIG. 8.
Figure 10:
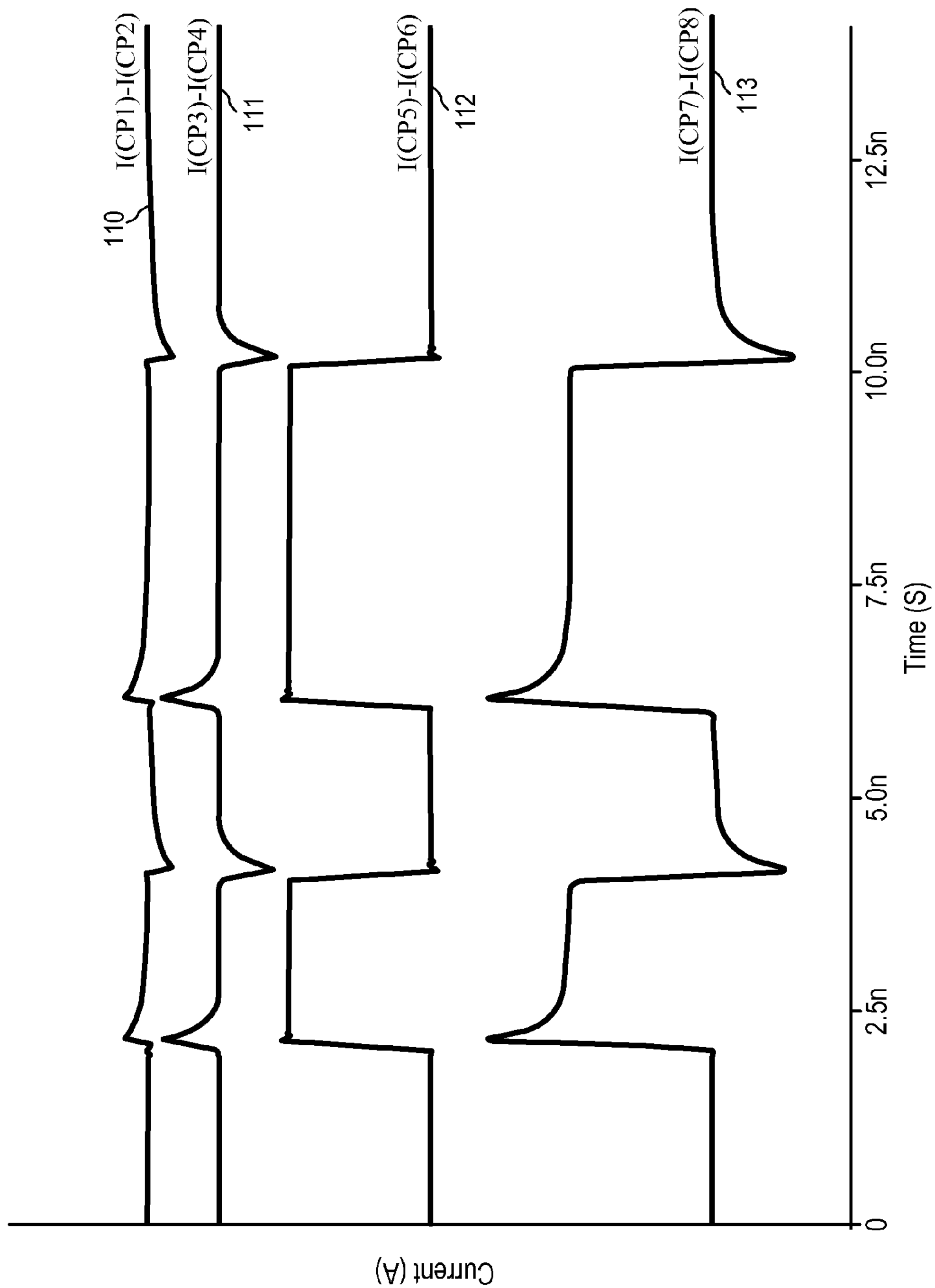
Figure 11:
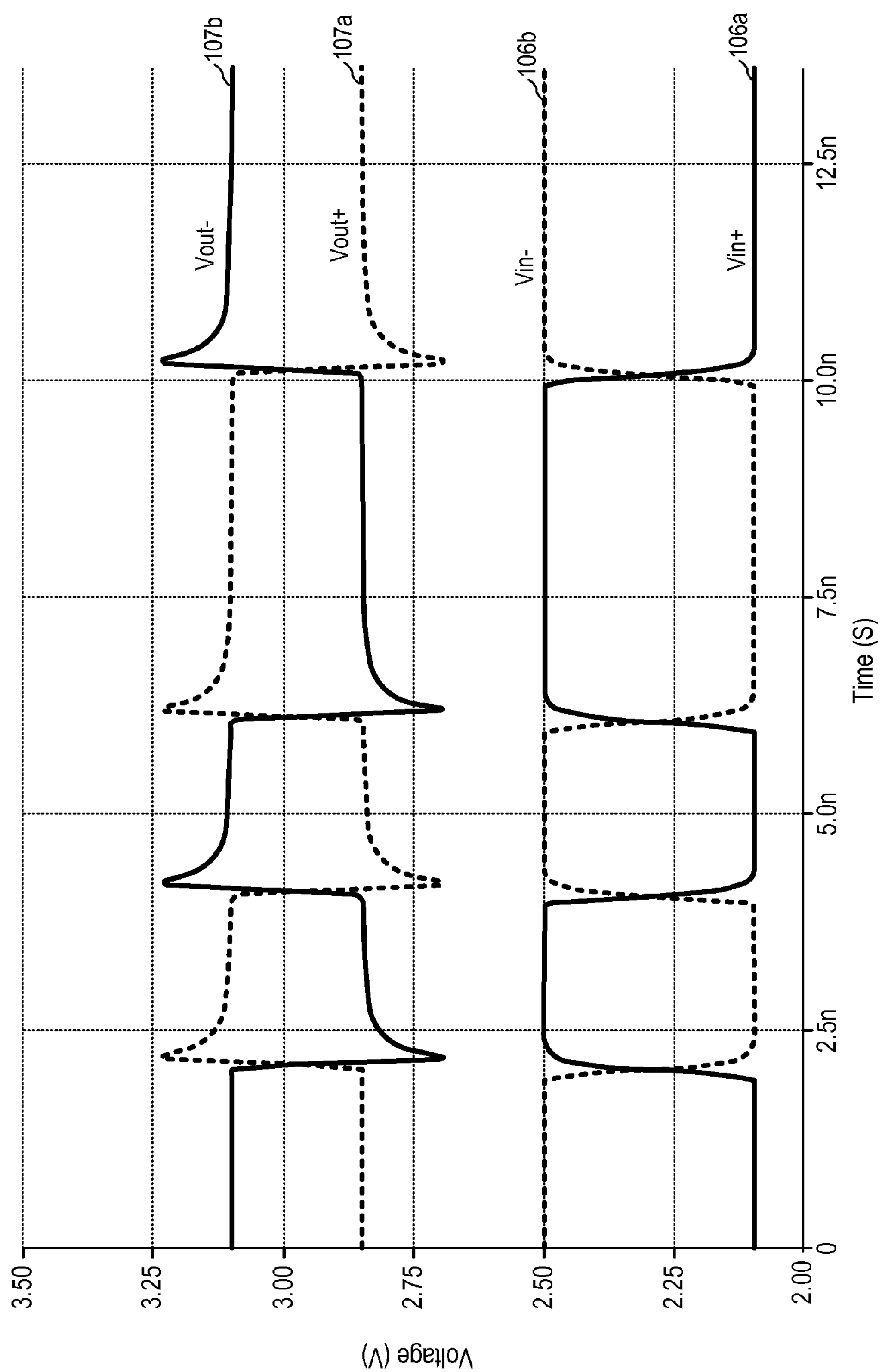

FIGS. 9-11 are waveform diagrams of signals in the pre-emphasis circuit of FIG. 8. Referring to FIG. 9, the individual branch output currents from the first secondary signal path (nodes CP1 and CP2) are shown as curves 105*a* and 105*b*. The differential output current of the signal path (I(CP1)-I(CP2)) gives an output signal with controlled overshoot (curve 106) at the rising and falling edges of the input voltage Vin. The amount and shape of the overshoot and the time constant are determined by the network embedded in the signal path (resistor R11 and capacitor C4) and the programmable bias current (I18).

FIG. 10 illustrates the differential output currents from the first and second secondary signal path and from the primary signal path. The curves shown in FIG. 10 are differential currents, having average values of zero. The curves in FIG. 10 are arbitrarily spread out in the vertical scale to better illustrate the shape and relative magnitude of each curve. The vertical spacing of the curves in FIG. 10 do not represent currents with different average DC values. Referring to FIG. 10, the differential output current (I(CP1)-I(CP2)) from the first secondary signal path (curve 110) and the differential output current (I(CP3)-I(CP4)) from the second secondary signal path (curve 111) are shown. The two differential output currents have different overshoot shapes, amplitude and time constants according to the unique network embedded in each signal path and the programmable bias current. On the other hand, the differential output current (I(CP5)-I(CP6)) from the primary signal path (curve 112) reflects the input signal Vin with insignificant signal transients at the rising and falling edges. The combined differential output currents (I(CP7)-I(CP8)) of the primary signal path and the two secondary signal paths (curve 113) is an output signal indicative of the input signal but with the combined overshoots of secondary signal paths added to the transitions (rising and falling edges) of the input signal.

Referring now to FIG. 11, the differential input voltage components Vin+, Vin− (curves 106*a*, 106*b*) are shown in contrast with the differential output voltage components Vout+, Vout− (curves 107*a*, 107*b*). As a result of the transient responses introduced by pre-emphasis circuit 100, programmable quantities of controlled overshoots from multiple parallel paths are synchronously added to the input signal Vin to generate a pre-emphasized output signal Vout, thus providing a practical method of compensating for frequency dependent losses of a subsequent driven, transmission line.

Figure 12:
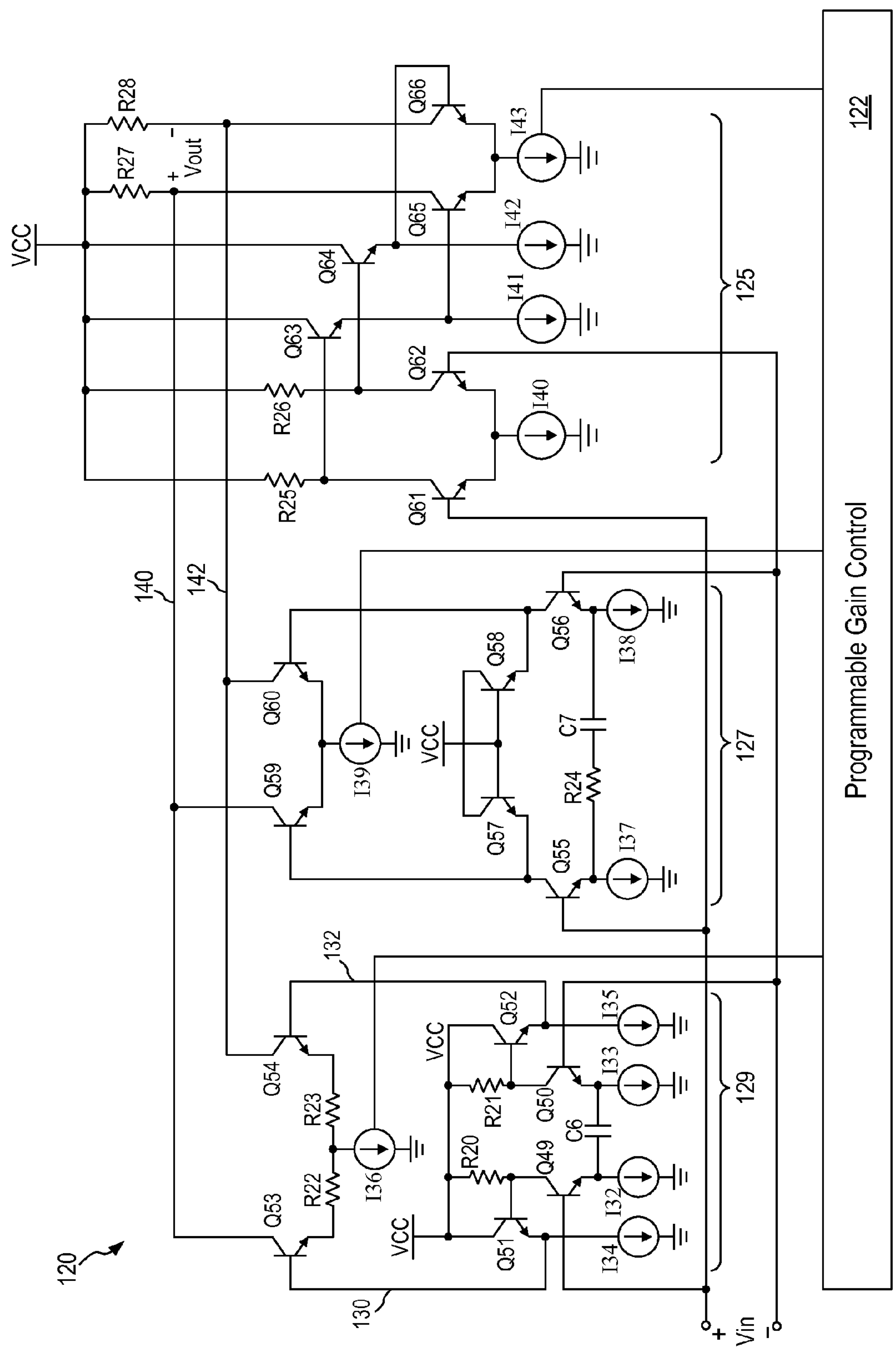
FIG. 12 is a transistor level circuit diagram of a transmission line pre-emphasis circuit according to an alternate embodiment of the present invention.

According to another aspect of the present invention, a pre-emphasis circuit incorporates a switching secondary signal path as an alternative method of providing a controlled overshoot to the input signal. More specifically, the switching secondary signal path generates overshoot pulses as opposed to decaying exponential waveforms and is sometimes referred to as "pulse shaping secondary signal path." FIG. 12 is a transistor level circuit diagram of a transmission line pre-emphasis circuit according to an alternate embodiment of the present invention. Referring to FIG. 12, a transmission line pre-emphasis circuit 120 includes a primary signal path 125 and a first secondary signal path 127. Primary signal path 125 and secondary signal path 127 are constructed in the same manner as described above and will not be further described. In particular, first secondary signal path 127 includes a wave shaping network of a resistor R24 and a capacitor C7 and provides a wave shaping signal with a decaying exponential waveform having a time constant determined by resistor R24 and capacitor C7.

Transmission line pre-emphasis circuit 120 further includes a secondary signal path 129 that is switching and referred hereinafter as the "switching secondary signal path." Switching secondary signal path 129 is different from the secondary signal path described above in that the input transistors of the differential pair are switched in operation. Furthermore, switching secondary signal path 129 is also different from the secondary signal path described above in that switching secondary signal path 129 generates fixed width, variable amplitude pulses that have fixed, abrupt rise and fall times (also referred to as edge rates) as opposed to the decaying exponential waveform having a specific time constant generated by secondary signal paths having a resistor-capacitor as the network. The pulses generated by the switching secondary signal path provide another way to introduce controlled overshoots to the pre-emphasized output signal. In the present description, a secondary signal path that provides a decaying exponential waveform having a given time constant will be referred to as a "wave shaping secondary signal path". On the other hand, a secondary signal path that provides a fixed or variable width, fixed or variable amplitude pulse will be referred to as a "switching secondary signal path" or a "pulse shaping secondary signal path."

More specifically, pulse shaping secondary signal path 129 includes a differential pair of transistors Q49 and Q50 with a capacitor C6 connected between the emitter terminals of the transistors forming the pulse shaping stage of the signal path. Capacitor C6 functions as the pulse shaping network. In operation, when the differential input voltage Vin changes state, the polarity of the differential base voltage between transistors Q49 and Q50 reverses. That is, the previously higher base voltage becomes the low base voltage and vice versa. Since the voltage across capacitor C6 cannot change instantaneously, current flow through the transistor with the now-lower base voltage is temporarily cutoff, and the bias current previously flowing through that emitter flows instead through C6. Consequently the collector current of the transistor with the now-lower base voltage becomes zero, while the collector current of the transistor with the now-higher base voltage becomes the sum of bias currents I32 and I33. This condition persists until the bias current sufficiently discharges capacitor C6 to fully reestablish forward bias of the emitter-base junction of the transistor with the lower base voltage. At that time bias currents I32 and I33 again flow through transistors Q49 and Q50 respectively. As currents I32 and I33 have identical values, the differential output current of the Q49, Q50 pair once again becomes zero. Assuming capacitor C6 fully charges or discharges before the next input state change, differential output current pulses (the "pulse shaping signal") at the collectors of Q49 and Q50 will exhibit a constant duration. The pulse duration is determined by the values of bias currents I32 and I33, the input voltage swing, and the capacitance value of capacitor C6, while the polarity of the pulse is determined by the polarity of the input voltage change.

Load resistors R20 and R21 convert this differential output current pulses into a differential voltage signal appearing on nodes 130 and 132 at the output of the first stage. This differential voltage signal subsequently drives the second stage current switch (the gain stage) formed by transistors Q53 and Q54. The second stage current switch fully switches the programmable current I36 into current summing nodes 140 and 142 where they are added to primary signal path current and any other secondary signal path currents, thereby providing the desired pre-emphasis. In sum, the transient response of the switching secondary signal path 129 is a differential current pulse of fixed duration wherein the pulse magnitude is determined by the programmable bias current I36.

In switching secondary signal path 129, transistors Q53 and Q54 drive the pulse generated by transistors Q49 and Q50 onto the summing nodes 140, 142. Resistors R22 and R23 are coupled to respective emitter terminals of transistors Q53 and Q54 and tail current source I36. In the present embodiment, tail current source I36 provides a programmable bias current through a programming signal from programmable gain control block 122. Tail current I36 determines the amplitude of the current pulse generated by the switching secondary signal path 129. Resistors R22 and R23 are used as ballast to reduce the effects of base-to-emitter voltage ($V_{BE}$) mismatches between transistors Q53 and Q54. Reducing $V_{BE}$ voltage mismatches between transistors Q53 and Q54 ensures that transistors Q53 and Q54 would split current I36 evenly between pulses. Resistors R22 and R23 typically have small resistance values, such that they do not prevent the complete switching of current I36.

Figure 13:
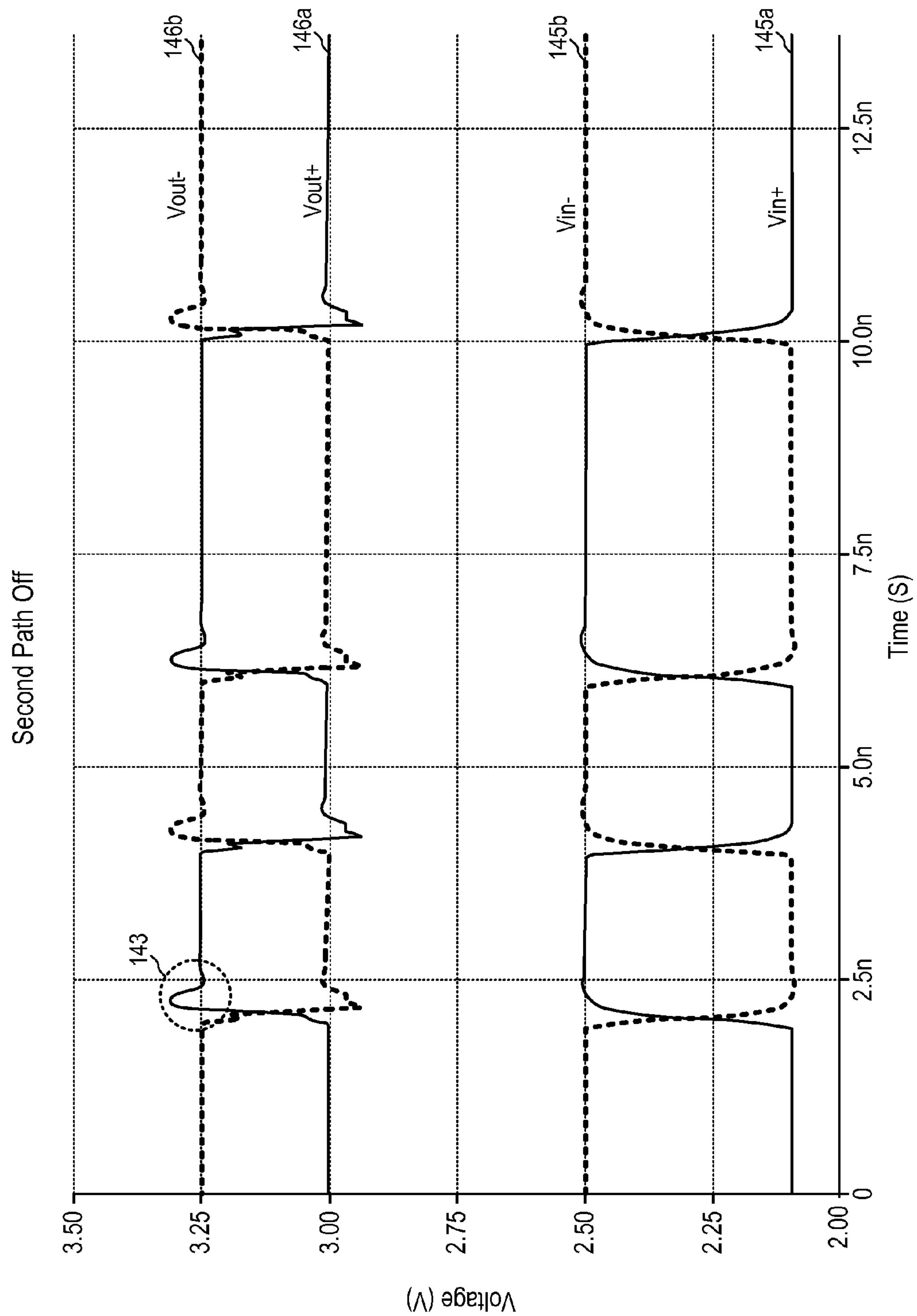
FIGS. 13-14 are waveform diagrams of signals in the pre-emphasis circuit of FIG. 12.
Figure 14:
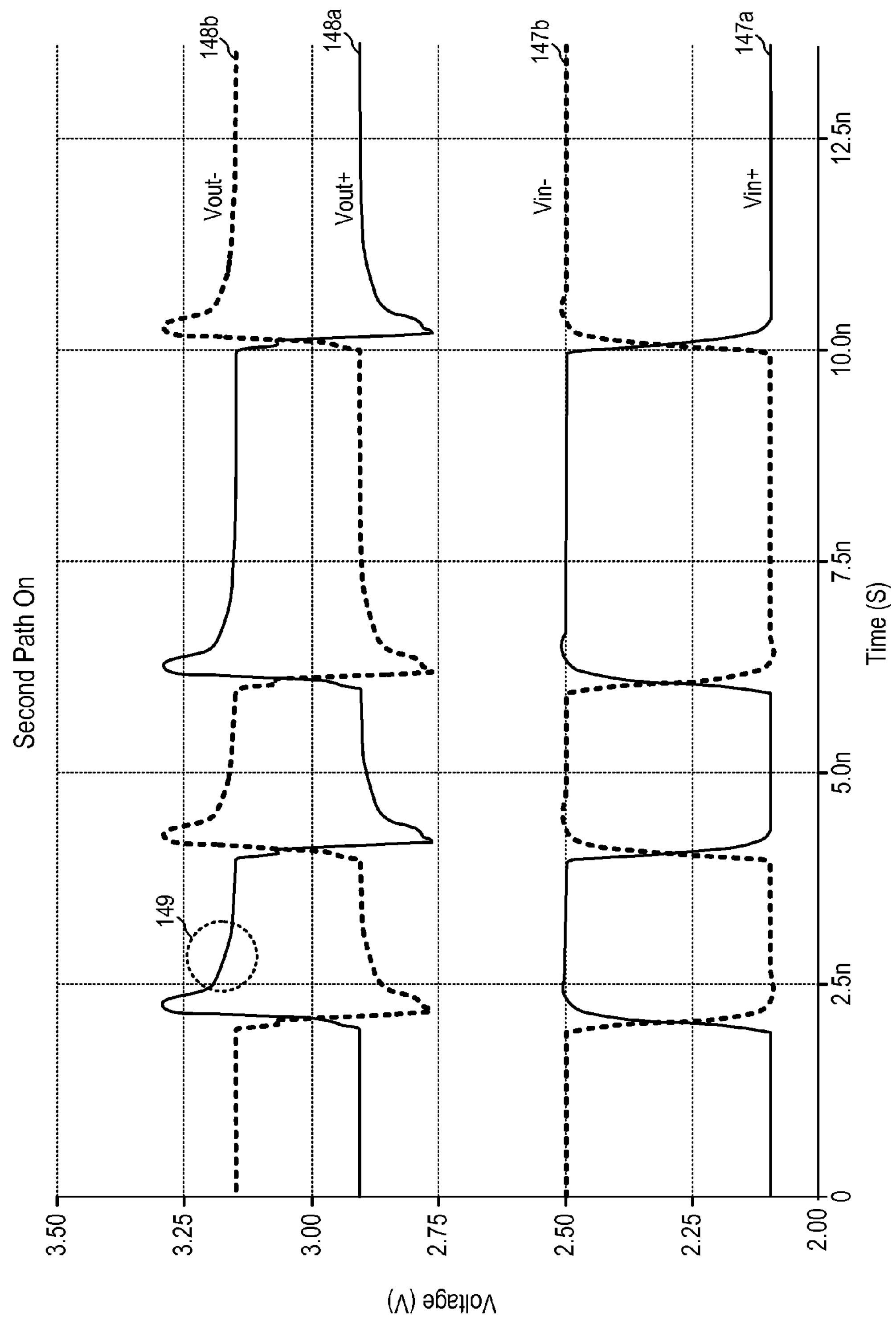

FIGS. 13-14 are waveform diagrams of signals in the pre-emphasis circuit of FIG. 12. FIGS. 13 and 14 both illustrate the differential input voltage components Vin+, Vin− and the differential output voltage components Vout+, Vout−. The input voltages are the same in both figures. FIG. 13 illustrates the case when the secondary signal path 127 is turned off and FIG. 14 illustrates the case when the secondary signal path 127 is turned on. In the present description, the secondary signal paths 127 and 129 are described as being turned on and off. When a secondary signal path is turned off by reducing the programmable bias current to zero, that secondary signal path does not contribute any differential output current or transient response to the output signal. It is imperative to note that while the contribution from one or more of the secondary signal paths can be turned off and turned on, the contribution is also programmable when the signal path is turned on so that a desired amount or a desired amplitude of transient response from that signal path is added to the output signal.

Referring first to FIG. 13, the rising and falling edges of the input voltage Vin+, Vin− (curves 145*a*, 145*b*) are transferred to the differential output voltage Vout+, Vout− (curves 146*a*, 146*b*) with the controlled overshoot provided by the switching secondary signal path 129 only. The overshoot is in the form of a pulse (denoted by dotted circle 143) with the duration of the pulse or the pulse width determined by the capacitance value of capacitor C6, the input voltage swing and the bias currents I32 and I33. The amplitude of the overshoot pulse is determined by the tail current I36.

When the secondary signal path 127 is turned on (FIG. 14), initial overshoot magnitudes are seen to be greater relative to the overshoot magnitudes shown in FIG. 13. Furthermore, the secondary signal path 127 introduces an RC decaying exponential at the trailing edge (dotted circle 149) of the overshoot, realizing wave shaping of the overshoot. It is imperative to note that when secondary signal path 127 is turned on, the signal path introduces extra DC current to load resistors R27 and R28 as compared to the case when the signal path is turned off (FIG. 13). Therefore, the average DC voltage levels of the output voltages Vout+ and Vout− (curves 148*a*, 148*b*) in FIG. 14 both drop by about 100 mV as compared to the output voltage Vout+, Vout− (curves 146*a*, 146*b*) in FIG. 13. Note both drops are identical. Hence the desired output signal, which is the difference between Vout+ and Vout−, is not affected by this common mode DC shift. The DC bias level drop and the decaying exponential at the trailing edge of the overshoots are both characteristics illustrating the addition of signal currents from secondary signal path 127 to those of secondary signal path 129 and the primary signal path 125.

In pre-emphasis circuit 120 of FIG. 12 and also in the other pre-emphasis circuit described above, one or more of the secondary signal paths can be turned on or off as needed by reducing the programmable bias current to zero and the amplitude of the transient response of each enabled secondary signal paths is programmable so that the desired overshoot can be obtained for the output signal. More importantly, a pre-emphasis circuit of the present invention can be constructed with one or more secondary signal paths all formed in a single integrated circuit. A set of secondary signal paths each providing different transient responses, such as a fast response, a slower exponential response, a narrow pulse response, can be selected so that a pre-emphasis circuit formed on a single integrated circuit can be used to provide relatively optimum pre-emphasis for a class of transmission line applications. For example, a pre-emphasis circuit with a set of secondary signal paths formed on a single integrated circuit can be used for a range of lengths of PCB traces or cables of certain characteristics. The programming control of the secondary signal paths and the primary signal path fine tunes the resultant overshoot to achieve near optimum pre-emphasis results using pre-emphasis circuits that can be built as a high volume, low cost, standard IC components.

In other embodiments of the present invention, any number of the programmable wave-shaping secondary signal paths, with the wave shaping stage first or last, can be mixed with any number of the programmable pulse shaping secondary signal path described above to form a pre-emphasis circuit providing the desired pre-emphasis transient responses. Thus, in other embodiments of the present invention, a transmission line pre-emphasis circuit can include a primary signal path and one or more of secondary signal paths selected from the collection of secondary signal paths described above. The collection of secondary signal paths include a secondary signal path having the wave shaping stage before the gain or scaling stage (as shown in FIGS. 1 and 6), a secondary signal path having the gain or scaling stage before the wave shaping stage (as shown in FIGS. 2 and 8), and a pulse shaping secondary signal path (as shown in FIG. 12). In some embodiments, a pre-emphasis circuit includes two or more pulse shaping secondary signal paths, each path with a different pulse width and programmable amplitude for the overshoot pulse so that a desired overshoot can be created as a result of combining the different overshoot pulses together. The selection and intermixing of the secondary signal paths provides flexibility in forming the transmission line pre-emphasis circuit so that the transmission line pre-emphasis circuit of the present invention can be readily adapted for a wide range of applications.

Figure 15:
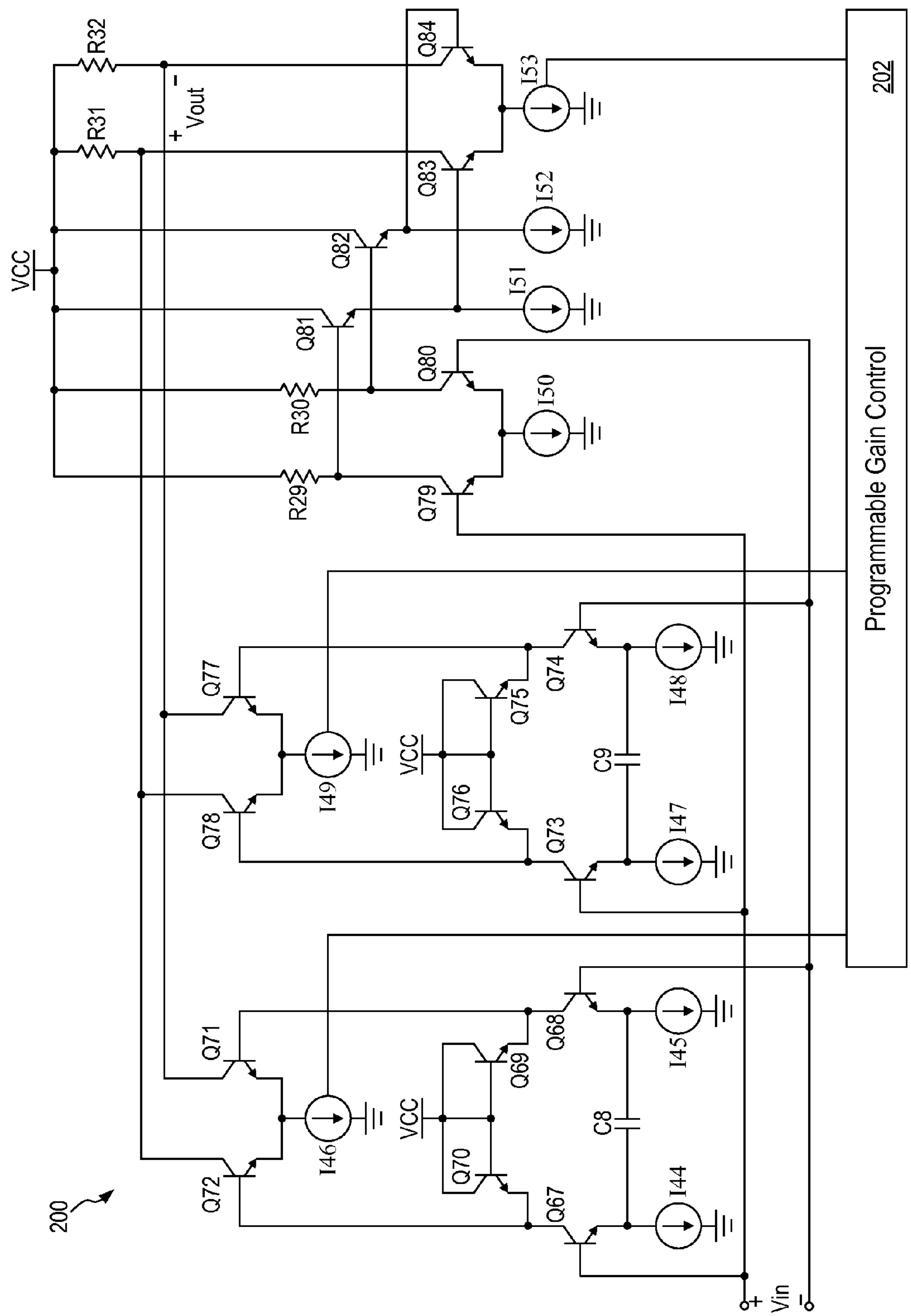
FIG. 15 is a transistor level circuit diagram of the transmission line pre-emphasis circuit incorporating two pulse shaping secondary signal paths according to one embodiment of the present invention.

FIG. 15 is a transistor level circuit diagram of the transmission line pre-emphasis circuit incorporating two pulse shaping secondary signal paths according to one embodiment of the present invention. Referring to FIG. 15, a pre-emphasis circuit 200 includes a first pulse shaping secondary signal path with a capacitor C8 as the pulse shaping network coupled to transistors Q67 and Q68 and a second pulse shaping secondary signal path with a capacitor C9 as the pulse shaping network coupled to transistors Q73 and Q74. The current pulses generated by the pulse shaping stage are coupled to a non-linear loading network formed by diode connected transistors Q69, Q70, Q75 and Q76 before being coupled to the gain or scaling stages (transistors Q71, Q72, Q77 and Q78). The bias currents I46 and I49 to the pulse shaping secondary signal paths are programmably adjusted to generate overshoot pulses having the desired amplitude. By using different capacitance values for the pulse shaping network (capacitors C8 and C9), overshoot pulses having different pulse width can be generated. The combination of overshoot pulses of different pulse widths can be advantageously applied to provide the desired pre-emphasis in the output signal Vout.

Figure 16:
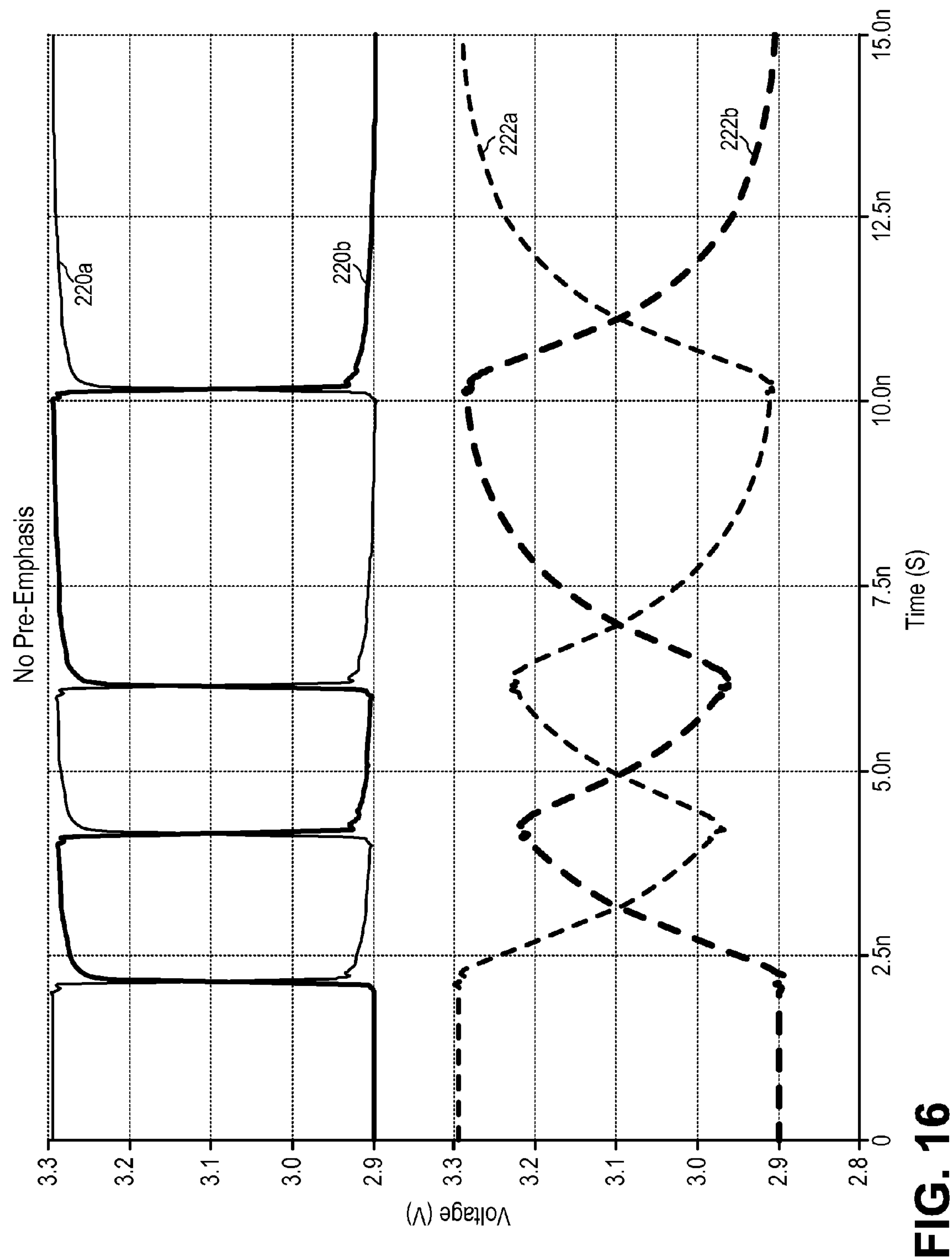
FIG. 16 is a waveform diagram of a digital data stream to be transmitted onto a hypothetical transmission line without pre-emphasis and the resulting signal at the receiver end of the hypothetical transmission line.

FIG. 16 is a waveform diagram of a digital data stream to be transmitted onto a hypothetical transmission line without pre-emphasis and the resulting signal at the receiver end of the hypothetical transmission line. The hypothetical transmission line is assumed to exhibit conventional transmission line loss characteristics where the response magnitude declines in an almost linear fashion as signal frequency increases. Referring to FIG. 16, curves 220*a* and 220*b* depict the differential signal waveform of the digital data stream at the transmitter end of the hypothetical transmission line. The differential signal has been properly amplified and exhibits clean signal transitions with no overshoots. However, when this signal reaches the receiver end of the transmission line (curves 222*a* and 222*b*), attenuation of the transmitted signal occurs to significantly alter the waveform shape of the received signal data stream. More specifically, while slow changing data patterns are able to maintain adequate signal magnitude, fast changing data patterns suffer from attenuation and loses much magnitude as a result of transmission line loss. The reduced amplitude of the fast changing data pattern makes it difficult for the receiver to correctly sense and detect the fast changing data pattern.

Figure 17:
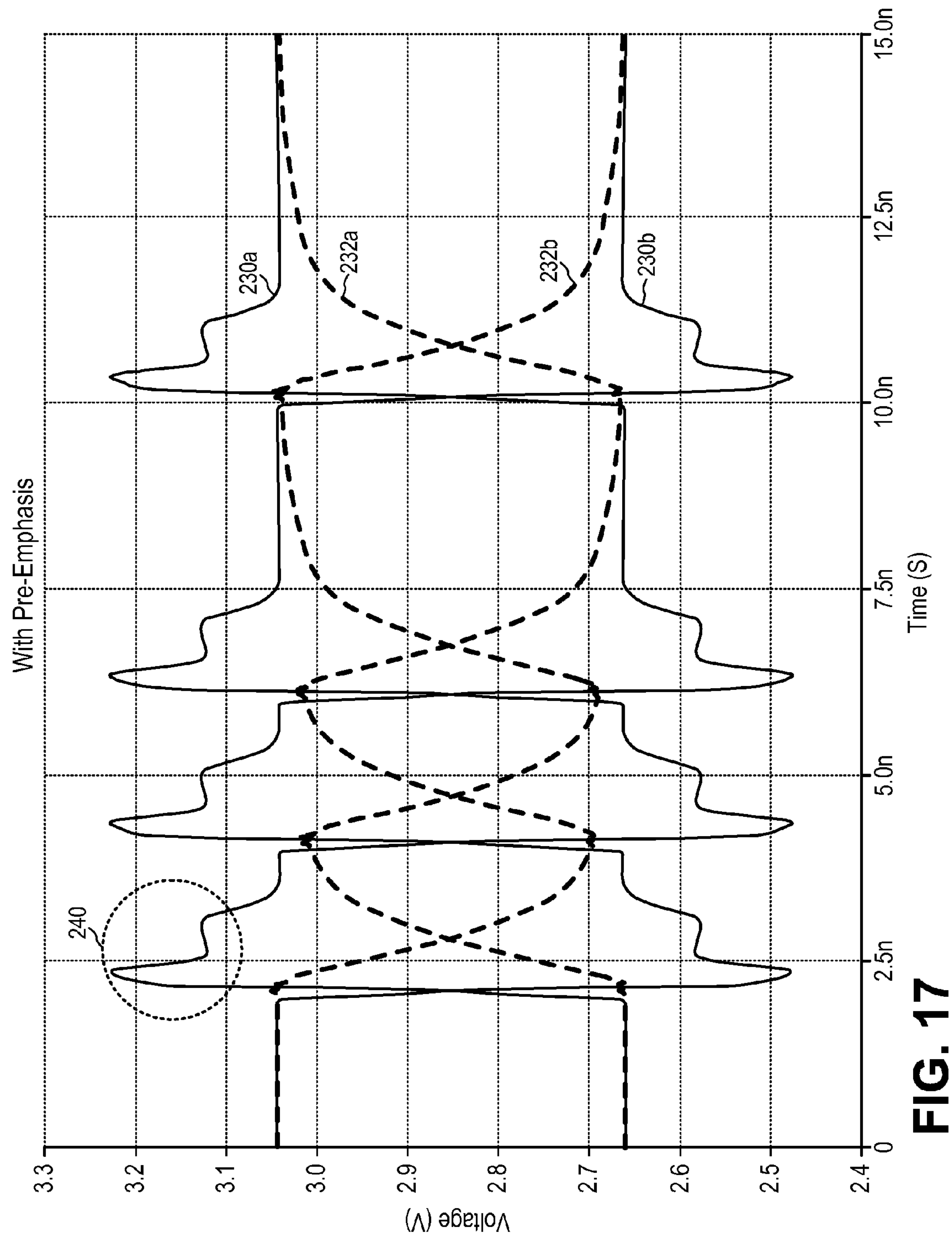
FIG. 17 is a waveform diagram of a digital data stream to be transmitted onto the hypothetical transmission line with the pre-emphasis of FIG. 15 applied and the resulting signal at the receiver end of the hypothetical transmission line according to one embodiment of the present invention.

FIG. 17 is a waveform diagram of a digital data stream to be transmitted onto the hypothetical transmission line with the pre-emphasis of FIG. 15 applied and the resulting signal at the receiver end of the hypothetical transmission line according to one embodiment of the present invention. Referring to FIG. 17, when the pre-emphasis generated by pre-emphasis circuit of FIG. 15 is applied, two overshoot pulses with different pulse widths are summed and added to the digital data stream to be transmitted. As a result of the combination of two overshoot pulses with different pulse widths, a staircase shaped controlled overshoot (dotted circle 240) is generated. The staircase shaped controlled overshoots mitigate the high frequency attenuation of the transmission line so that the digital data stream can be transmitted through to the receiver end (curves 232*a* and 232*b*) of the transmission line without loss of signal integrity. More specifically, curves 232*a* and 232*b* show that the signal magnitude for the fast changing data pattern is about the same as the signal magnitude of the slow changing data pattern, enabling reliable and accurate detection of the transmitted digital data stream.

It is also instructive to note that due to the filtering characteristics of the transmission line, the overshoots or steps appearing in the signal to be transmitted (curves 230*a*/230*b*) are completely smoothed out when the signal reaches the receiver end. Therefore, the particular shape of the controlled overshoot, whether a decaying exponential or a pulse or a staircase shaped overshoot, have limited effect on the final signal waveform shape at the receiver end but do act to preserve signal magnitude for fast changing data patterns.

Pre-Emphasis Circuit Configurations

In the above-description, various embodiments of a transmission line pre-emphasis circuit are described as including a primary signal path and one or more secondary signal paths. The primary signal path provides switched currents indicative of the digital data stream while the one or more secondary signal paths provide overshoot signals which are added to the primary signal path output signal to generate a pre-emphasized digital output signal for transmission onto a transmission line. More specifically, different types of secondary signal paths are described, including a wave shaping secondary signal path and a pulse shaping secondary signal path. In the above described embodiments, each secondary signal path includes a gain stage or a scaling stage to adjust or modify the amplitude of the overshoot signal.

Figures 18, 19:
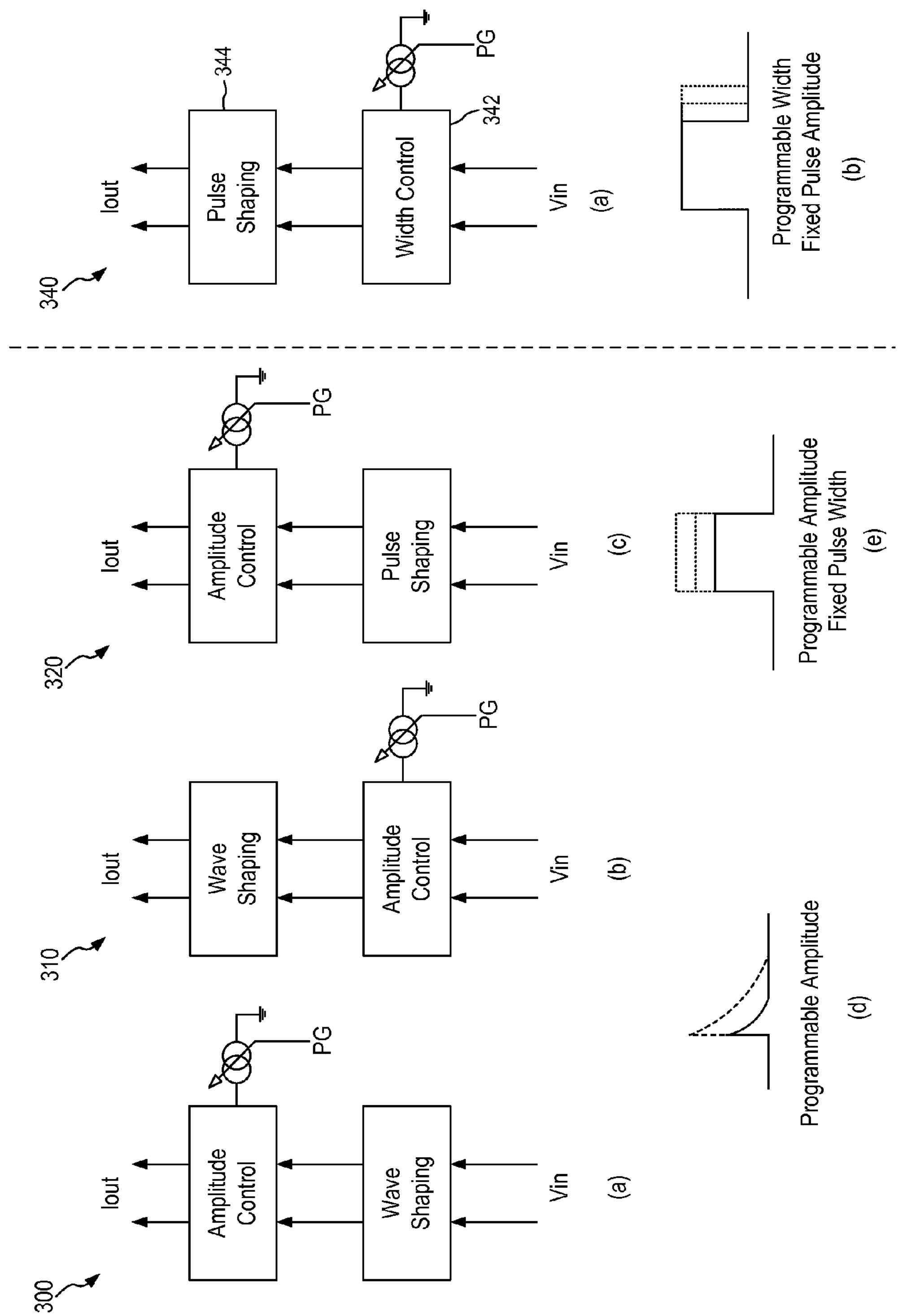
FIG. 18 illustrates embodiments of the secondary signal paths in the transmission line pre-emphasis circuit of the present invention described above.
FIG. 19 illustrates a pulse shaping secondary signal paths in a transmission line pre-emphasis circuit of the present invention according to an alternate embodiment of the present invention.

FIG. 18 illustrates embodiments of the secondary signal paths in the transmission line pre-emphasis circuit of the present invention described above. Referring to FIG. 18, a wave shaping secondary signal path can be configured with the wave shaping stage before the gain (or scaling) stage (path 300) or the wave shaping stage after the gain (or scaling) stage (path 310). In the present description, the gain stage or the scaling stage is also referred to as an "amplitude control" stage as the gain stage operates to scale or modify the amplitude of the overshoot signal.

For either signal path 300 or 310, the overshoot signal generated assumes a shape determined by the network embedded in the wave shaping stage with the amplitude of the overshoot signal modified by the amplitude control stage. When the network is a resistor-capacitor (RC) network, the overshoot signal is a decaying exponential waveform having a time constant determined by the resistance and capacitance of the RC network, as shown in FIG. 18(*d*). The wave shaping secondary signal paths, configured with either amplitude control stage first or amplitude control stage last, provide an overshoot signal with a programmable amplitude.

Furthermore, in the above described embodiments, a pulse shaping secondary signal path (path 320) includes a pulse shaping stage before the gain stage which is an amplitude control stage. Signal path 320 generates an overshoot signal being a fixed width, variable amplitude pulse, as shown in FIG. 18(*e*).

In FIGS. 18(*d*) and 18(*e*) and in the following descriptions, only the positive-going overshoot signals are show. It is understood that the pre-emphasis circuit of the present invention generates both positive-going and negative-going overshoots at the positive-going and negative-going transitions of the input signal. The positive-going overshoot signals shown in FIG. 18 and in subsequent figures are illustrative only.

Pulse Shaping Path with Programmable Pulse Width

According to another aspect of the present invention, a transmission line pre-emphasis circuit includes a primary signal and a pulse shaping secondary signal path for generating an overshoot pulse with fixed pulse amplitude and programmable pulse width. FIG. 19 illustrates a pulse shaping secondary signal path in a transmission line pre-emphasis circuit of the present invention according to an alternate embodiment of the present invention. Referring to FIG. 19, a pulse shaping secondary signal path 340 is configured with a width control stage 342 before a pulse shaping stage 344. Width control stage 342 functions as the scaling stage and is implemented with programmable scaling control set by a DC programming signal PG. More specifically, the scaling control of width control stage 342 is set by a DC bias current provided by a programmable current source controlled by the DC programming signal PG. In secondary signal path 340, the adjustment provided by width control stage 342 modifies the pulse width of the overshoot pulse generated by the pulse shaping stage while leaving the pulse amplitude at a fixed value, as shown in FIG. 19(*b*). The operation of pulse shaping secondary signal path 340 will be described in more detail below.

Figure 20:
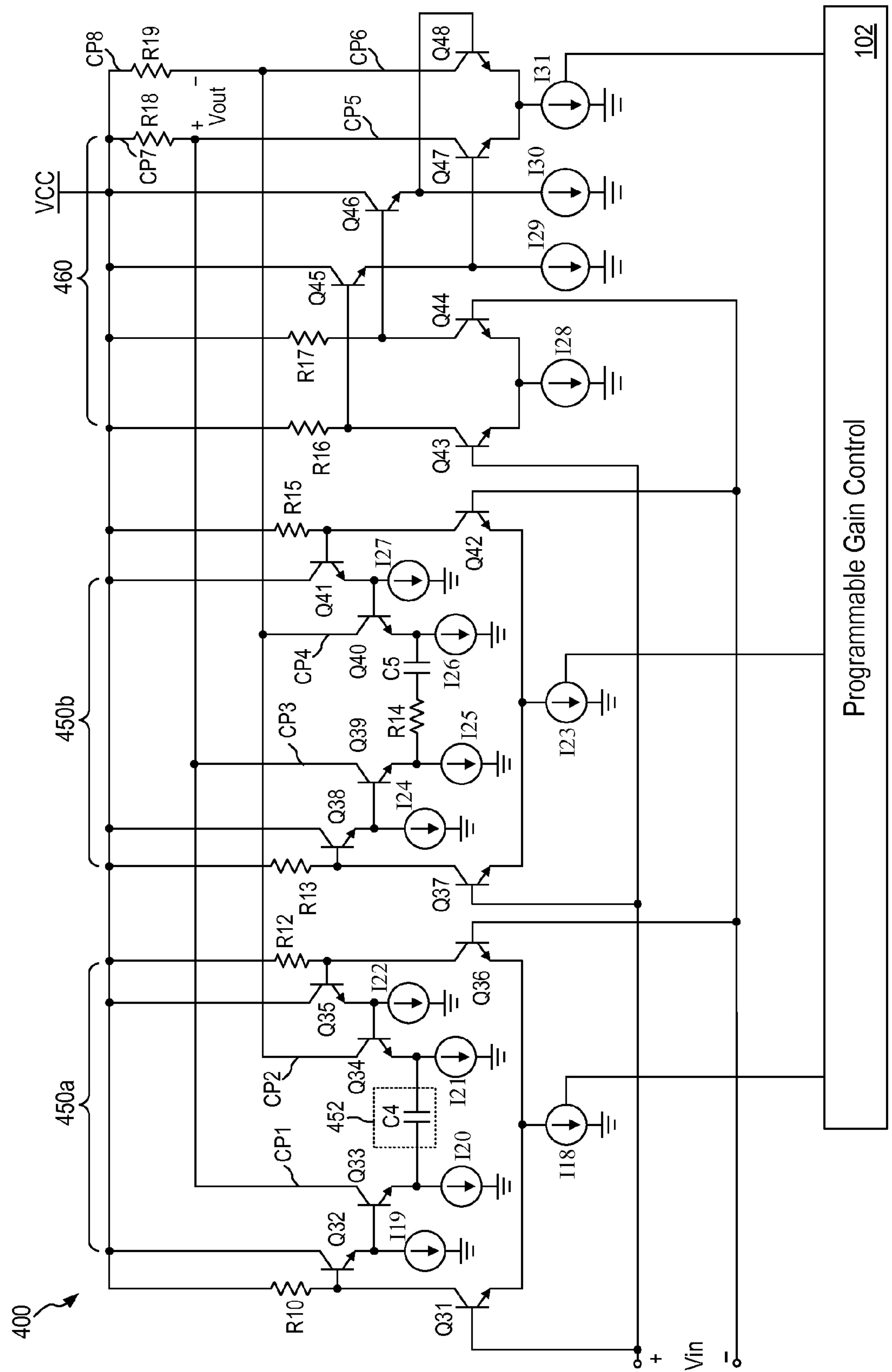
FIG. 20 is a transistor level circuit diagram of a transmission line pre-emphasis circuit incorporating the secondary signal path of FIG. 19 according to one embodiment of the present invention.

FIG. 20 is a transistor level circuit diagram of a transmission line pre-emphasis circuit incorporating the secondary signal path of FIG. 19 according to one embodiment of the present invention. FIG. 20 is modified from FIG. 8 above and like elements are given like reference numerals and will not be further described. Referring to FIG. 20, a transmission line pre-emphasis circuit 400 includes, among other things, a primary signal path 460, a first secondary signal path 450*a* being a pulse shaping secondary signal path and a second secondary signal path 450*b* being a wave shaping secondary signal path.

In pulse shaping secondary signal path 450*a*, a capacitor C4 forms the pulse shaping network for generating a pulse as the overshoot signal. The width control stage of signal path 450*a* is formed by transistors Q31 and Q36 as the differential pair and resistors R10 and R12 as the linear loads. The differential pair is biased by a programmable current I18. The differential output voltage at the collector terminals of transistors Q31 and Q36 varies with the magnitude of the programmable current I18. When the value of current I18 changes, the amplitude of the differential voltage swing driving transistors Q32 and Q35 changes accordingly and in turn, the differential voltage swing driving the switch formed by transistors Q33 and Q34 also changes.

Transistors Q33 and Q34 form the pulse shaping stage of the secondary signal path 450*a*. The voltage swing at the input to transistors Q32 and Q35 determines the amount of voltage charging/discharging capacitor C4 needs from current sources I20 and I21 following any input voltage Vin transition and before both transistors Q33 and Q34 conduct again. As a result, the change in the voltage swing results in a linearly proportional change in charge/discharge time which determines the pulse width of the overshoot pulse. Accordingly, pulse shaping secondary signal path 450*a*, configured with the width control stage before the pulse shaping stage, generates overshoot pulses having fixed amplitude but variable pulse width, as shown in FIG. 19(*b*).

Wave shaping secondary signal path 450*b* is constructed in the same manner as the wave shaping secondary signal paths in pre-emphasis circuit 100 of FIG. 8 and details and operation of wave shaping secondary signal path 450*b* will not be further described. The decaying exponential overshoot signal generated by wave shaping secondary signal path 450*b* is added synchronously to the overshoot pulse generated by pulse shaping secondary signal path 450*a* to provide the desired pre-emphasis.

The pulse shaping secondary signal path of FIG. 19 and signal path 450*a* of FIG. 20 provide alternate ways of generating a desired overshoot pulse for the transmission line pre-emphasis circuit, providing further flexibility in implementing transmission line pre-emphasis in accordance with the present invention.

Overshoot Signal with Dual Programmability

According to another aspect of the present invention, a transmission line pre-emphasis circuit includes a primary signal and one or more secondary signal paths with dual programmability. That is, the secondary signal paths allow programming of both the width and the amplitude of the overshoot signal. In one embodiment, the secondary signal path implements programmable bias currents to both scaling and shaping stages of the signal path. In this manner, both the amplitude and the width of the overshoot signal become variable, providing even greater control over the shape of the pre-emphasized output signal. The transmission line pre-emphasis circuit can thus be applied to a wide range of transmission line applications to provide effective pre-emphasis solutions. In the present embodiment, a secondary signal path with both the scaling stage and the shaping stage with programmable gain will be referred to as a "dual programmable" secondary signal path.

Figure 21:
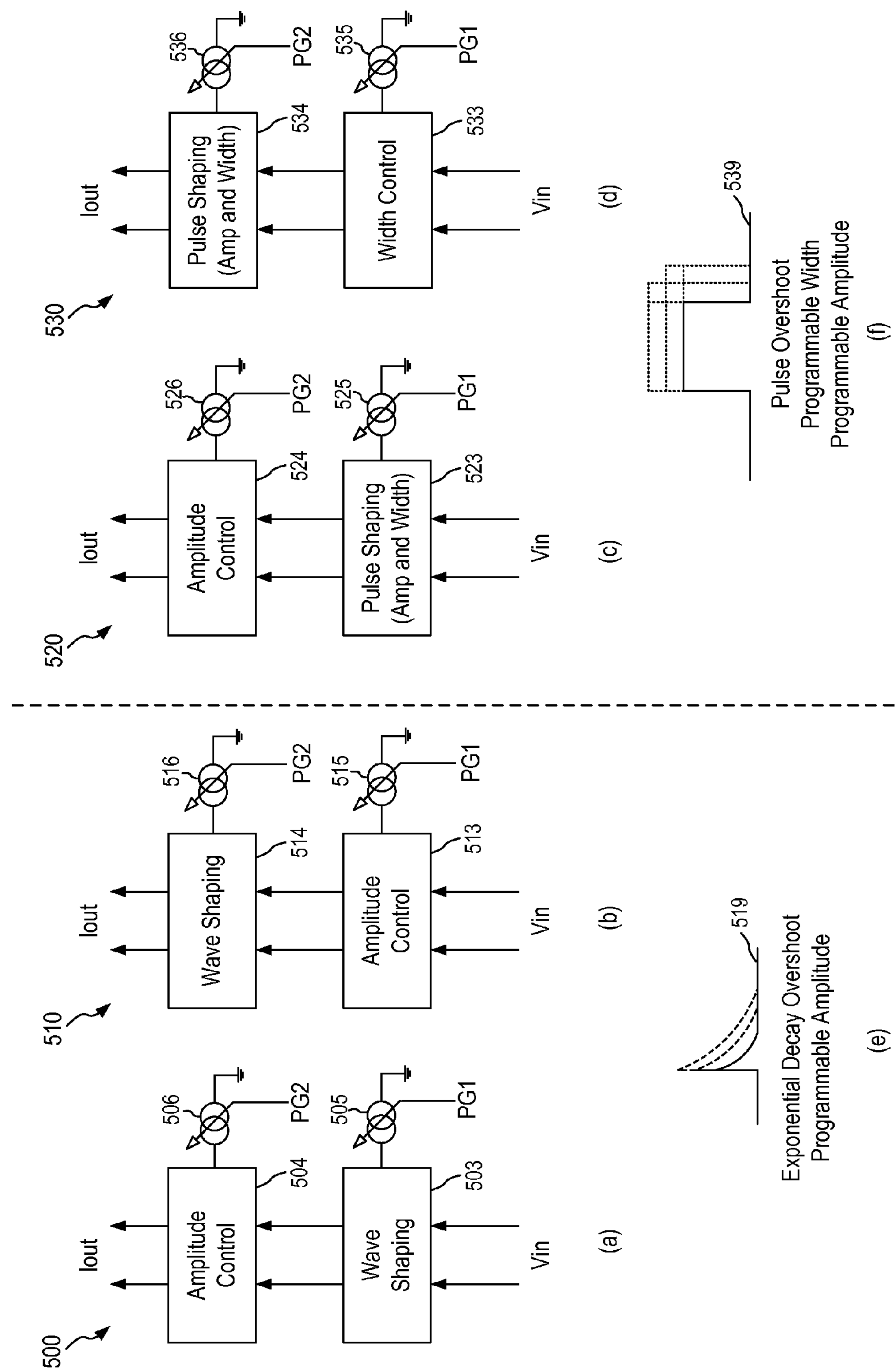
FIG. 21 illustrates embodiments of dual programmable secondary signal paths for use in a transmission line pre-emphasis circuit according to alternate embodiments of the present invention.

FIG. 21 illustrates embodiments of dual programmable secondary signal paths for use in a transmission line pre-emphasis circuit according to alternate embodiments of the present invention. Referring to FIG. 21(*a*), a dual programmable secondary signal path 500 includes a wave shaping stage 503 before an amplitude control stage 504. Both wave shaping and amplitude control stages are provided with programmable bias currents. More specifically, wave shaping stage 503 receives a DC bias current provided by a programmable current source 505 controlled by the DC programming signal PG1. The gain of amplitude control stage 504 is set by a DC bias current provided by a programmable current source 506 controlled by the DC programming signal PG2.

FIG. 21(*b*) illustrates another configuration of the dual programmable secondary signal path. A dual programmable secondary signal path 510 includes an amplitude control stage 513 before the wave shaping stage 514. Both wave shaping and amplitude control stages are provided with programmable bias currents. More specifically, the gain of the amplitude control stage 513 is set by a DC bias current provided by a programmable current source 515 controlled by the DC programming signal PG1. Wave shaping stage 514 receives a DC bias current provided by a programmable current source 516 controlled by the DC programming signal PG2.

In the embodiments shown in FIGS. 21(*a*) and (*b*), as long as the bias current from current source 505 or 516 supplying the wave shaping stage 503 or 514 is large enough to keep the wave shaping stage transistors turned on, programmability of the bias current to the wave shaping stage does not have any effect on the overshoot signal. The bias current 506 or 515 supplying the amplitude control stage modulates the amplitude of the output overshoot signal. For instance, when the wave shaping stage 503 or 514 incorporates a resistor-capacitor network, a decaying exponential overshoot signal, as shown in FIG. 21(*e*), is generated. Varying the bias current 505 or 516 within a range that keeps the wave shaping stage transistors turned on do not affect the decaying exponential overshoot signal. However, varying the bias current 506 or 515 causes the amplitude of the decaying exponential overshoot signal to vary. In some cases, when the bias current is so low as to cause the wave shaping stage transistors to switch on and off, a complex overshoot signal results, as will be described in more detail below with reference to FIG. 30.

FIG. 21(*c*) illustrates another configuration of the dual programmable secondary signal path. A dual programmable secondary signal path 520 includes a pulse shaping stage 523 before an amplitude control stage 524. Both the pulsing shaping and amplitude control stages are provided with programmable bias currents. The pulse shaping stage 523 further functions as a width and amplitude control stage. Pulse shaping stage 523 receives a DC bias current provided by a programmable current source 525 controlled by the DC programming signal PG1. The gain of amplitude control stage 524 is set by a DC bias current provided by a programmable current source 526 controlled by the DC programming signal PG2.

FIG. 21(*d*) illustrates another configuration of the dual programmable secondary signal path. A dual programmable secondary signal path 530 includes a width control stage 533 before the pulse shaping stage 534. Both pulse shaping and width control stages are provided with programmable bias currents. The pulse shaping stage 534 further functions as an amplitude and width control stage. The gain of the width control stage 533 is set by a DC bias current provided by a programmable current source 535 controlled by the DC programming signal PG1. Pulse shaping stage 534 receives a DC bias current provided by a programmable current source 536 controlled by the DC programming signal PG2. When the secondary signal paths 520, 530 incorporate a pulse shaping stage, overshoot pulses with programmable pulse width and programmable pulse amplitude are obtained, as shown in FIG. 21(*f*).

Figure 22:
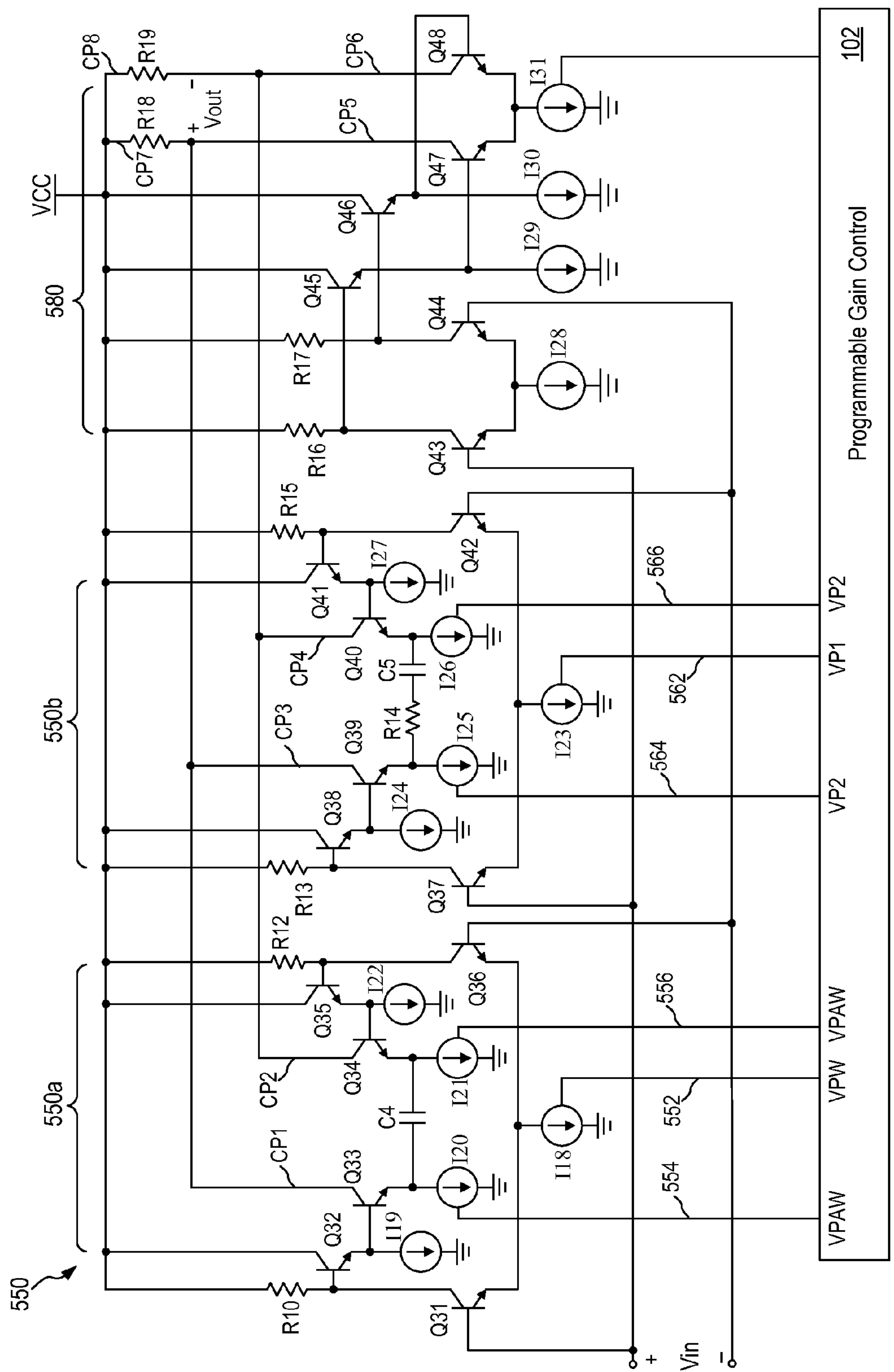
FIG. 22 is a transistor level circuit diagram of a transmission line pre-emphasis circuit incorporating dual programmable secondary signal paths according to one embodiment of the present invention.

FIG. 22 is a transistor level circuit diagram of a transmission line pre-emphasis circuit incorporating dual programmable secondary signal paths according to one embodiment of the present invention. FIG. 22 is modified from FIG. 20 and like elements are given like reference numerals and will not be further described. Referring to FIG. 22, a transmission line pre-emphasis circuit 550 includes, among other things, a primary signal path 580, a first secondary signal path 550*a* being a dual programmable pulse shaping secondary signal path and a second secondary signal path 550*b* being a dual programmable wave shaping secondary signal path. In both secondary signal paths, the scaling stage is configured before the pulse/wave shaping stage and both stages are provided with programmable bias currents.

More specifically, dual programmable pulse shaping secondary signal path 550*a* includes a programmable bias current I18, controlled by a programming signal VPW on a signal line 552, to vary the pulse width of the overshoot pulse generated by the secondary signal path, as described above. To provide control over the pulse amplitude, bias currents I20 and I21 are also provided with programmable control. In the present embodiment, a programming signal VPAW is provided on signal lines 554 and 556 to vary currents I20 and I21. Because both currents I20 and I21 should have the same current value, both currents may be controlled by the same programming signal, either on the same signal line or via separate signal line. Varying the bias currents I20 and I21 changes the amplitude of the differential output current pulses at transistors Q34 and Q34. However, because currents I20 and I21 also transiently flow through capacitor C4 after a Vin transition, varying currents I20 and I21 also varies the pulse width of the overshoot pulse. The combination of programmable currents I18, I20 and I21 enables the programming of both the amplitude and pulse width of the overshoot pulse. More specifically, a range of pulse amplitude and width combinations can be achieved readily by first setting the amplitude via the programming signal VPAW and then adjusting the programming signal VPW to obtain the desired width for the overshoot pulse.

Referring still to FIG. 22, dual programmable wave shaping secondary signal path 550*b* operates in a similar manner as secondary signal path 450*b* in FIG. 20 except that bias currents I25 and I26 are programmable in signal path 550*b*. More specifically, a programming signal VP1 is provided on a signal line 562 to control bias current I23 supplying the amplitude control stage formed by transistors Q37 and Q42 of the secondary signal path. Another programming signal VP2 is provided on signal lines 564 and 566 to control currents I25 and I26 supplying the pulse shaping stage formed by transistor Q39 and Q40 of the secondary signal path. Because both currents I25 and I26 should have the same current value, both currents may be controlled by the same programming signal, either on the same signal line or via separate signal line.

In secondary signal path 550*b*, the wave shaping network is a RC network including resistor R14 and capacitor C5. As long as the bias currents I25 and I26 are sufficiently large to keep transistors Q39 and Q40 turned on, secondary signal path 550*b* generates an overshoot signal being a variable amplitude decaying exponential (curve 519 in FIG. 21(*e*)). Programmable current I23 varies the pulse amplitude of the decaying exponential overshoot signal. In the case where bias currents I25 and I26 are varied to a small enough value so that one of transistors Q39 or Q40 momentarily turn off after each Vin transition, a complex overshoot signal results as will be explained in more detail below with reference to FIG. 30.

Figure 23:
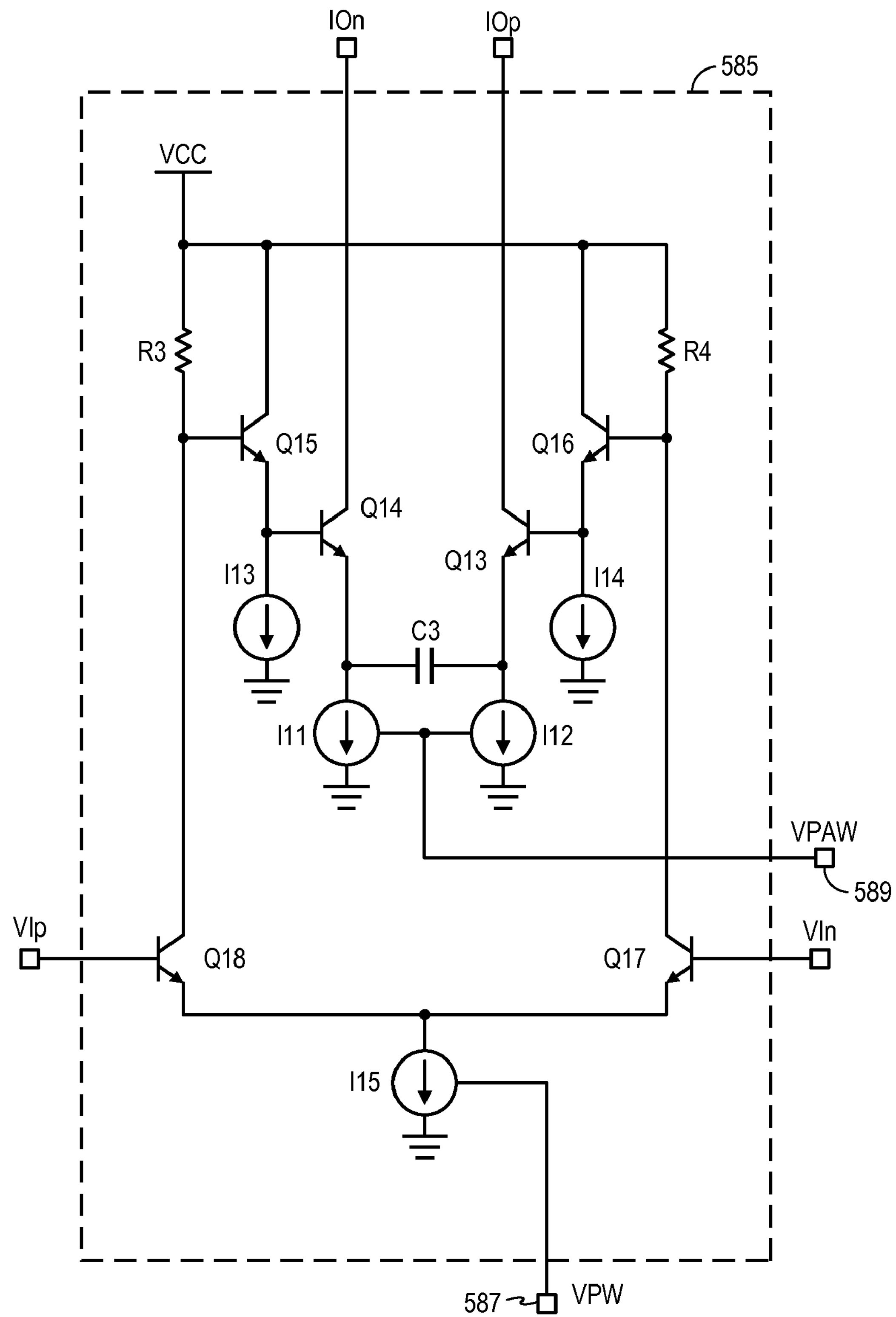
FIG. 23 is a transistor level circuit diagram of a pulse shaping secondary signal path with dual programmability according to one embodiment of the present invention.

FIG. 23 is a transistor level circuit diagram of a pulse shaping secondary signal path with dual programmability according to one embodiment of the present invention. FIG. 23 illustrates a pulse shaping secondary signal path configured with the width control stage first where the pulse shaping stage bias currents are controlled by a common DC programming signal. Referring to FIG. 23, transistors Q18 and Q17, forming the width control stage, is biased by current I15 controlled by a DC programmable signal VPW (node 587). Transistors Q13 and Q14, forming the pulse shaping stage, are biased by currents I11 and I12. Bias current I11 and I12 are controlled by the programmable signal VPAW (node 589).

Assuming circuit right-left symmetry, i.e. currents I11=I12, resistors R3=R4, and currents I13=I14, the differential output current Io (Io=Iop−Ion) will have pulse amplitude and pulse width given as follows:

$$Io=\pm 2*I11;$$

and $$\text{Pulse width}=2*C3*R3*I15/I11.$$

Thus, the output pulse amplitude is determined solely by the values of current I11 and I12 in the pulse shaping stage and is varied solely through DC programming signal VPAW (node 589). However, the output pulse width is determined by the ratio of the bias current in the first stage (I15) to the bias current in the second stage (I11). Thus, the pulse width is varied by both the DC programming signal VPW (node 587) and the DC programming signal VPAW (node 589). Accordingly, desired combinations of width and amplitude can be readily achievable by first setting the amplitude via the programming signal VPAW and then setting the width via the programming signal VPW.

Figure 24:
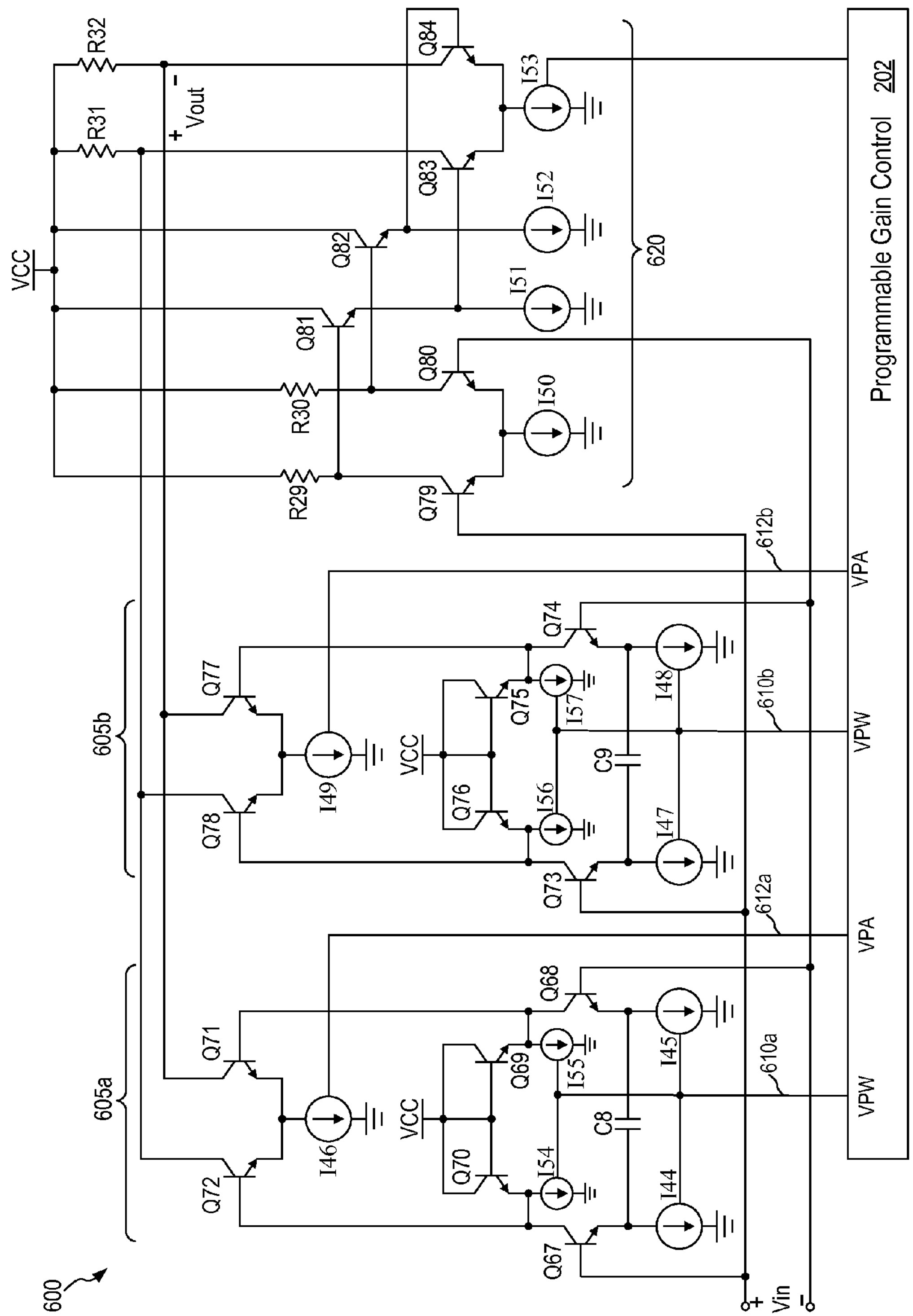
FIG. 24 is a transistor level circuit diagram of a transmission line pre-emphasis circuit incorporating dual programmable secondary signal paths according to another embodiment of the present invention.

FIG. 24 is a transistor level circuit diagram of a transmission line pre-emphasis circuit incorporating two dual programmable secondary signal paths according to yet another embodiment of the present invention. FIG. 24 is modified from FIG. 15, and like elements are given like reference numerals and will not be further described. Referring to FIG. 24, a transmission line pre-emphasis circuit 600 includes, among other things, a primary signal path 620, a first secondary signal path 605*a* being a dual programmable pulse shaping secondary signal path and a second secondary signal path 605*b* being another dual programmable pulse shaping secondary signal path. In both secondary signal paths, the amplitude control stage is configured after the pulse shaping stage and both stages are provided with programmable bias current. Secondary signal path 605*a* includes a capacitor C8 as the pulse shaping network and secondary signal path 605*b* includes a capacitor C9 as the pulse shaping network. In general, the capacitance value for capacitor C8 is different from the capacitance value for capacitor C9 to generate different overshoot pulses from the two secondary signal paths.

Figure 25:
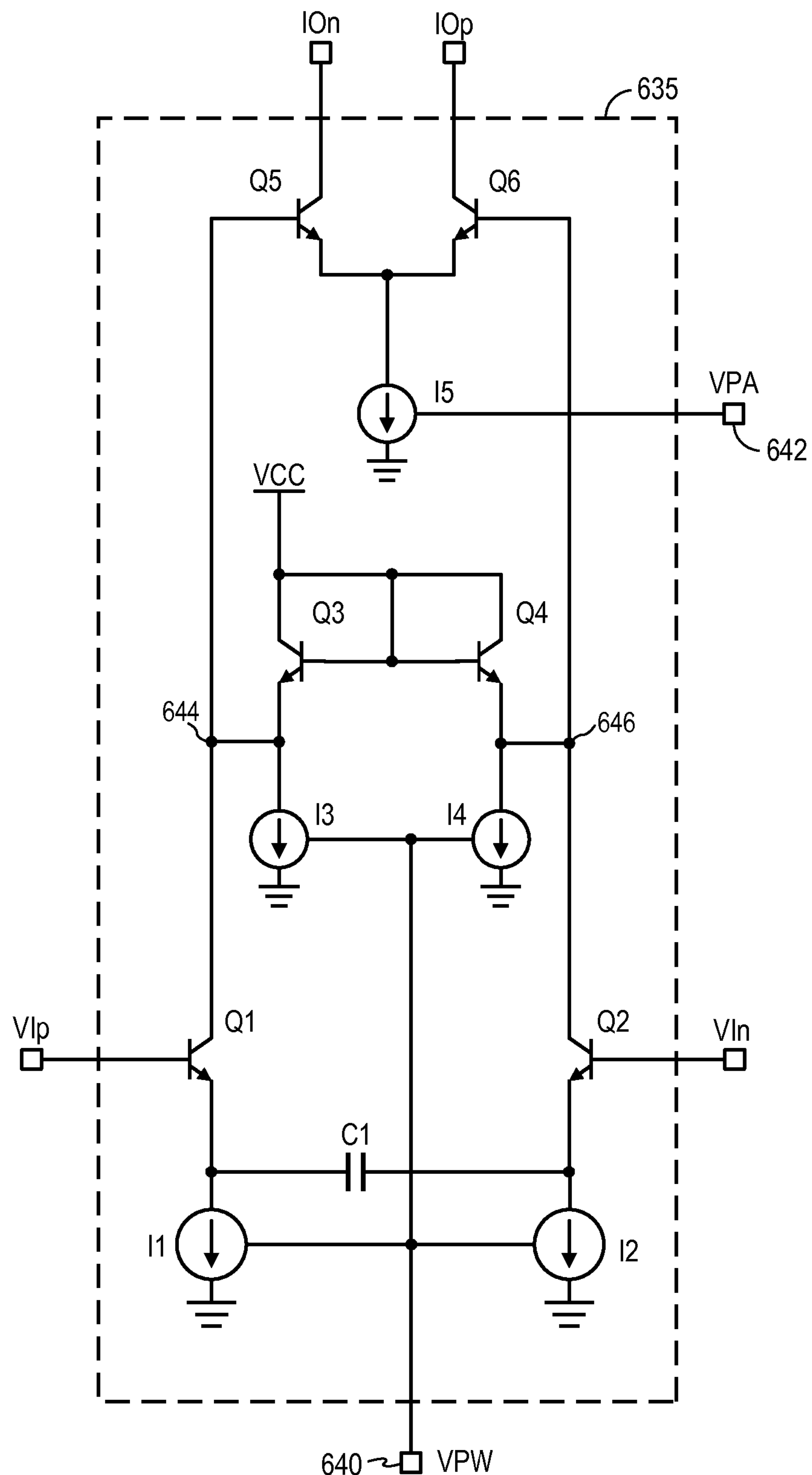
FIG. 25 is a transistor level circuit diagram illustrating one instance of a pulse shaping secondary signal path with dual programmability and pulse shaping stage before gain stage according to one embodiment of the present invention.

The two pulse shaping secondary signal paths 605*a*, 605*b* in transmission line pre-emphasis circuit 600 are similarly constructed and description of only one of the signal paths is provided below with reference to FIG. 25. FIG. 25 is a transistor level circuit diagram illustrating one instance of a pulse shaping secondary signal path with dual programmability and pulse shaping stage before the amplitude control stage according to one embodiment of the present invention. Referring to FIG. 25, a pulse shaping secondary signal path 635 includes transistors Q1 and Q2 forming a differential switch with an embedded network formed by a capacitor C1. Transistors Q1 and Q2 are coupled to a non-linear loading network formed by diode connected transistors Q3 and Q4. The amplitude control stage of pulse shaping secondary signal path 635 is formed by transistors Q5 and Q6.

Dual programmability of the pulse shaping secondary signal path 635 is implemented through programmable current sources I1 to I5. Current sources I1, I2, I3 and I4 are all controlled by a DC programming signal VPW (node 640). Current source I5 is controlled by a DC programming signal VPA (node 642). Currents I1 and I2 provide the bias currents for transistors Q1 and Q2 forming the differential switch of the pulse shaping stage. Currents I3 and I4 provides bias currents to the diode-connected load transistors Q3 and Q4. Currents I3 and I4 provide a minimum current in transistors Q3 and Q4 to maintain a predictable, low impedance at their emitter terminals (nodes 644, 646), avoiding unwanted response aberrations. Bias currents I3 and I4 also concretely define the ratio of currents flowing through transistors Q3 and Q4 during switching, which in turn defines the ratio of currents flowing through transistors Q6 and Q5, respectively. By controlling current sources I1 to I4 using the same DC programming signal VPW, the values for currents I3 and I4 change proportionally with currents I1 and I2 to ensure constant emitter current ratio for each switching state from transistors Q3 and Q4. The emitter current ratios at transistors Q3 and Q4 do not vary with the current magnitudes.

In pulse shaping secondary signal path 635, DC programming signal VPW controls currents I1 to I4 to modulate the pulse width of the overshoot pulse. DC programming signal VPA, controlling current I5, modulates the amplitude of the overshoot pulse. Assuming circuit right-left symmetry, i.e. currents I1=I2 and currents I3=I4, the differential output current, Io=Ion−Iop, will have amplitude and pulse width given as:

$$Io=\pm I5*I1/(I1+I3);$$

and $$\text{Pulse width}=2*C1*Vin/I1,$$

where Vin=|VIp−VIn| and represent the difference between the maximum and minimum voltage values applied to the input terminals Vip and Vin.

In the embodiment shown in FIG. 25, bias currents I1, I2, I3 and I4 are connected together and they are varied proportionally to vary the pulse width of the overshoot pulse. In other embodiments, bias currents I3 and I4 may be a fixed current. In that case, varying bias currents I1 and I2 not only adjusts the pulse width but would also set a certain amplitude for the overshoot signal. In this manner, a pulse shaping stage implementing width and amplitude control is realized.

Figure 26:
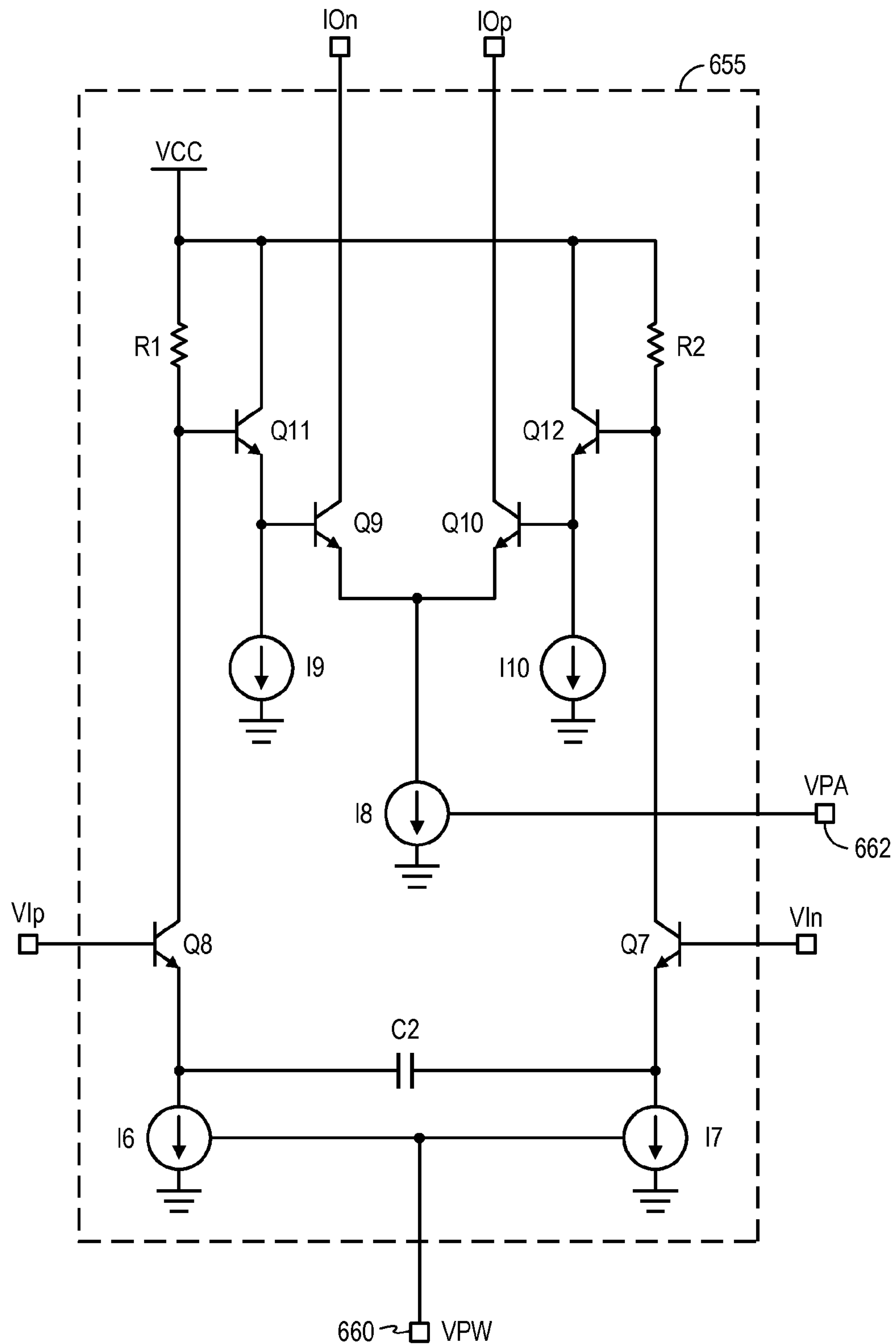
FIG. 26 is a transistor level circuit diagram illustrating one instance of a pulse shaping secondary signal path with dual programmability and pulse shaping stage before gain stage according to an alternate embodiment of the present invention.

FIG. 26 is a transistor level circuit diagram illustrating one instance of a dual programmable pulse shaping secondary signal path with the pulse shaping stage before the amplitude control stage according to an alternate embodiment of the present invention. The dual programmable pulse shaping secondary signal path of FIG. 26 can be incorporated in the transmission line pre-emphasis circuit of FIG. 24 in place of or in addition to the existing secondary signal paths. Referring to FIG. 26, dual programmable pulse shaping secondary signal path 655 is configured with the pulse shaping stage before the amplitude control stage. Pulse shaping secondary signal path 655 is different from signal path 635 of FIG. 25 in that a resistor load is used for the differential switch (transistors Q7, Q8) of the pulse shaping stage instead of diode load. To that end, a resistor R1 is coupled to the collector terminal of transistor Q8 and a resistor R2 is coupled to the collector terminal of transistor Q7.

For proper circuit operation, right-left symmetry is assumed, i.e. currents I6=I7, resistors R1=R2, and currents I9=I10. Furthermore, Vin voltage swing must be large and fast enough to completely switch both first stage bias current (I6 and I7) into either transistor Q8 or transistor Q9, and that the voltage swing this then produces across resistors R1 and R2 is large enough to switch the transistors Q9, Q10 pair from its quiescent 50%-50% state to fully switched. Under these operating conditions, the differential output current amplitude and width are independently controlled by the DC programming signals VPA for pulse amplitude and VPW for pulse width and are given as:

$$Io=\pm I8$$

$$\text{Pulse width}=2*C2*Vin/I6.$$

In an alternate embodiment, emitter resistors having small resistance values are added between the emitter terminals of transistors Q9 and Q10 and current source I8 to enhance the equal splitting of tail current I8 during quiescent states.

Figure 27:
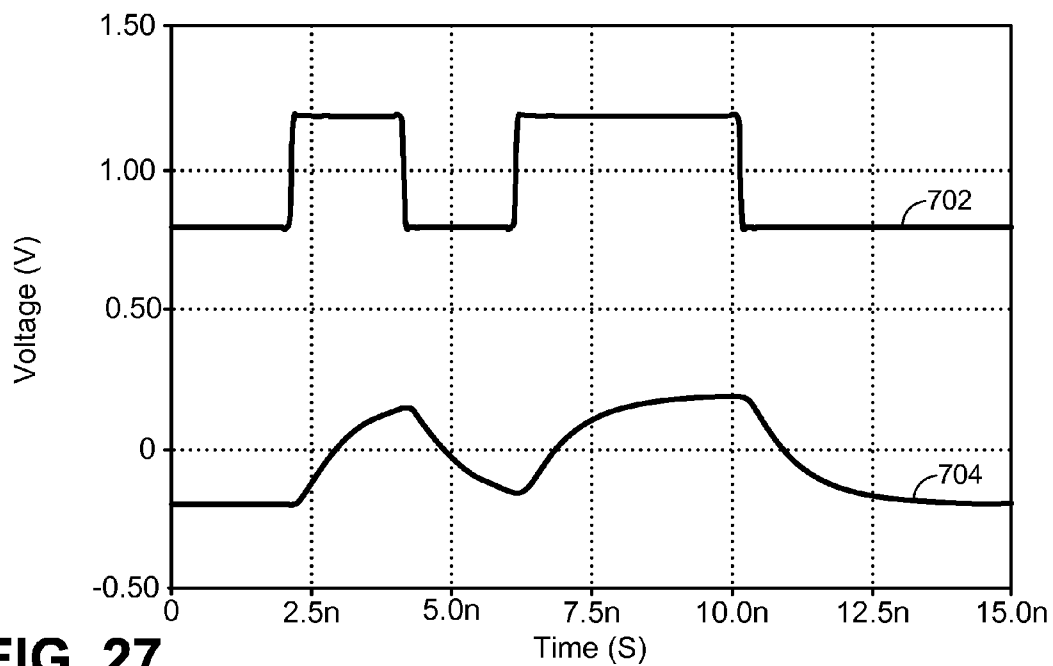
FIG. 27 is a waveform diagram of a digital data stream to be transmitted onto a hypothetical transmission line without pre-emphasis and the resulting signal at the receiver end of the hypothetical transmission line.

FIG. 27 is a waveform diagram of a digital data stream to be transmitted onto a hypothetical transmission line without pre-emphasis and the resulting signal at the receiver end of the hypothetical transmission line. The hypothetical transmission line is assumed to exhibit conventional transmission line loss characteristics where the response magnitude declines as signal frequency increases. Referring to FIG. 27, curve 702 depicts a signal waveform of the digital data stream at the transmitter end of the hypothetical transmission line and curve 704 depicts a corresponding signal waveform of the digital data stream at the receiver end of the hypothetical transmission line. When the transmitted signal (curve 702) reaches the receiver end of the transmission line (curve 704), attenuation of the transmitted signal occurs to significantly alter the waveform shape of the received signal data stream. More specifically, while slow changing data patterns are able to maintain adequate signal magnitude, fast changing data patterns suffer from attenuation and loses much magnitude as a result of transmission line loss. Also, the rise and fall times of the received signal are significantly slower than the transmitted signal. Both factors make sensing fast data more difficult.

Figure 28:
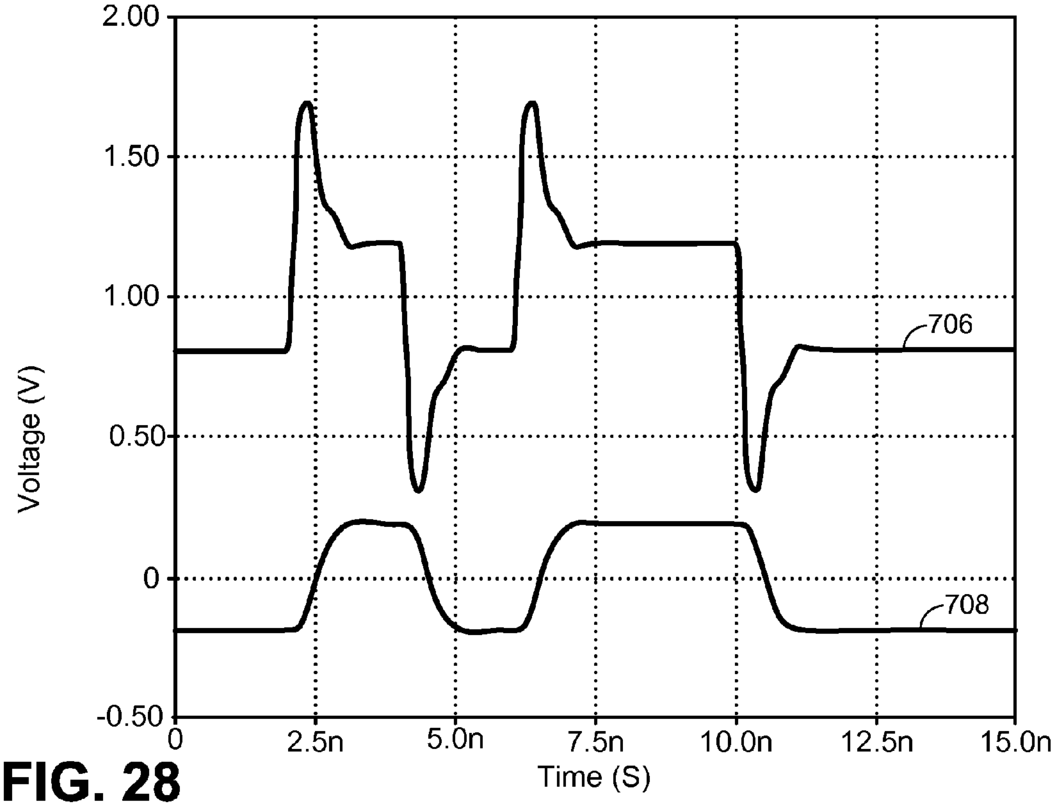
FIG. 28 is a waveform diagram of a digital data stream to be transmitted onto the hypothetical transmission line with the pre-emphasis of FIG. 24 applied and the resulting signal at the receiver end of the hypothetical transmission line according to one embodiment of the present invention.

FIG. 28 is a waveform diagram of a digital data stream to be transmitted onto the hypothetical transmission line with the pre-emphasis of FIG. 24 applied and the resulting signal at the receiver end of the hypothetical transmission line according to one embodiment of the present invention. Referring to FIG. 28, curve 706 depicts a signal waveform of the digital data stream at the transmitter end of the hypothetical transmission line and curve 708 depicts the corresponding signal waveform of the digital data stream at the receiver end of the hypothetical transmission line. When the pre-emphasis circuit of FIG. 24 is applied, two overshoot pulses with different pulse widths and amplitudes are summed and added to the digital data stream to be transmitted. As a result of the combination of two overshoot pulses with different pulse widths, a staircase shaped controlled overshoot is generated. The staircase shaped controlled overshoots mitigate the high frequency attenuation of the transmission line so that the digital data stream can be transmitted through to the receiver end (curve 708) of the transmission line with significantly less degradation of signal integrity. More specifically, curve 708 shows that the received signal of the pre-emphasized transmitted signal more ideally duplicates the transmitted signal (curve 702 of FIG. 27). That is, the received digital data stream (curve 708) from the pre-emphasis transmitted signal (curve 706) includes fast rise and fall times and levels that quickly settle to their DC values. Another indication of improvement is the area under the curve of the received signal to the zero axis. A comparison of curve 704 (without pre-emphasis) and curve 708 (with pre-emphasis) shows that when pre-emphasis is used, the area under the curve to the zero axis increased significantly. The larger this area, the easier it becomes to sense the received data without error.

It is also instructive to note that due to the filtering characteristics of the transmission line, the steps appearing in the overshoot signal to be transmitted (curve 706) are completely smoothed out when the signal reaches the receiver end. Therefore, these particular aberrations in the shape of the controlled overshoot do not affect the final signal waveform shape at the receiver end but only acts to preserve signal magnitude especially for fast changing data patterns.

Through the use of one or more secondary signal paths, such as those described in FIGS. 18, 19 and 21, to provide pre-emphasis to a digital data stream to be transmitted, the transmission line pre-emphasis circuit of the present invention provides flexibility and ease of use not achievable with conventional pre-emphasis circuit. Furthermore, the transmission line pre-emphasis circuit of the present invention enables the implementation of a single design to be applied to a wide range of transmission line applications.

An advantageous feature of the transmission line pre-emphasis circuit of the present invention is that a combination of one or more of the secondary signal paths in FIGS. 18, 19 and 21 can be used to generate the desired overshoot signal. For instance, any number of wave shaping secondary signal paths may be combined with any number of pulse shaping secondary signal paths. In some cases, use of the pulse shaping secondary signal paths only provides particular advantages because of the simple pulse shaping network of a single capacitor. Thus, a transmission line pre-emphasis circuit can be constructed using two or more dual programmable pulse shaping secondary signal paths generating overshoot pulses with variable amplitude and width. Overshoot pulses with different pulse width and amplitude are summed synchronously with the primary signal path output to provide the desired pre-emphasis output signal.

Figure 29:
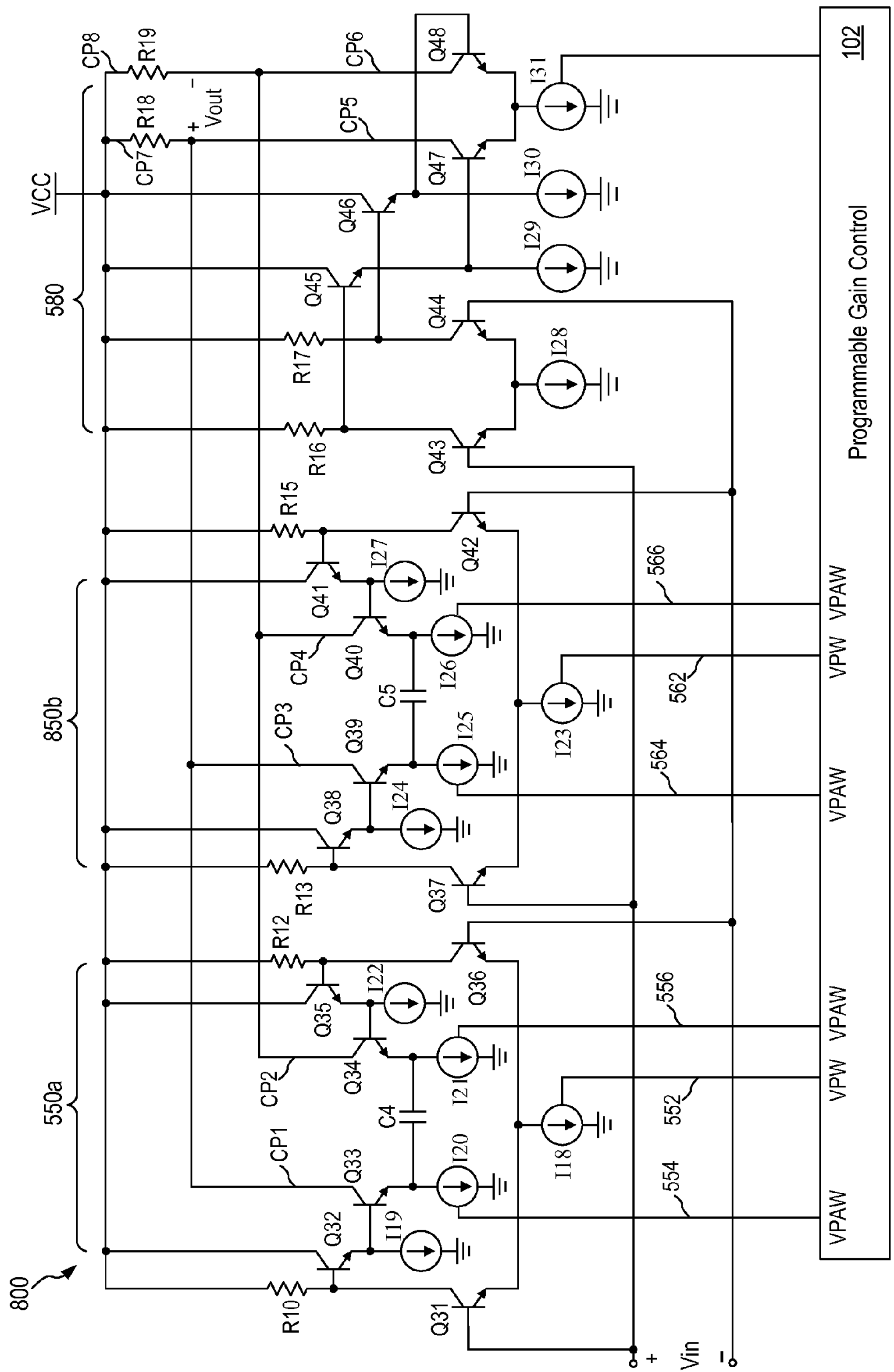
FIG. 29 is a transistor level circuit diagram of a transmission line pre-emphasis circuit incorporating dual programmable secondary signal paths according to an alternate embodiment of the present invention.

FIG. 29 is a transistor level circuit diagram of a transmission line pre-emphasis circuit incorporating dual programmable secondary signal paths according to an alternate embodiment of the present invention. FIG. 29 is modified from FIG. 22 and like elements are given like reference numerals and will not be further described. Referring to FIG. 29, a transmission line pre-emphasis circuit 800 includes, among other things, a primary signal path 580, a first secondary signal path 550*a* being a dual programmable pulse shaping secondary signal path and a second secondary signal path 850*b* being a dual programmable pulse shaping secondary signal path. In both secondary signal paths, the scaling stage is configured before the pulse shaping stage and both stages are provided with programmable bias currents. Transmission line pre-emphasis circuit 800 generates overshoot pulses at each secondary signal paths which are summed synchronously with the primary path output signal. A desired pre-emphasized output signal Vout can be generated by combining overshoot pulses of different pulse amplitudes and pulse widths.

According to another aspect of the present invention, a transmission line pre-emphasis circuit generates a complex overshoot signal by varying the bias current provided to the shaping stage. In particular, when the wave shaping secondary signal paths described above are operated with small bias currents or large input swing, the wave shaping secondary signal paths generate a complex overshoot signal different from the decaying exponential overshoot signal described above.

Figure 30:
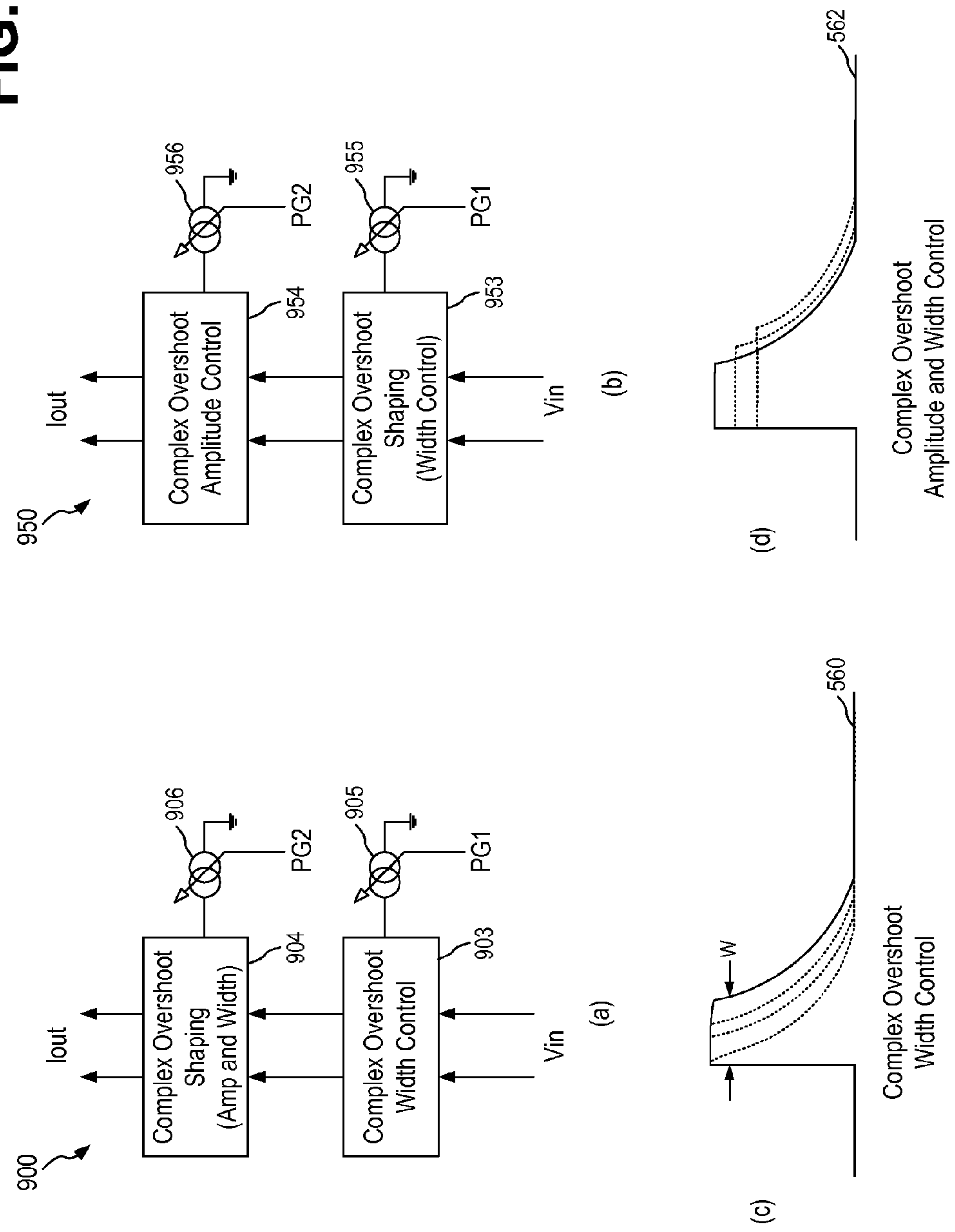
FIG. 30 illustrates embodiments of dual programmable secondary signal paths for use in a transmission line pre-emphasis circuit according to alternate embodiments of the present invention.

FIG. 30 illustrates embodiments of dual programmable secondary signal paths for use in a transmission line pre-emphasis circuit according to alternate embodiments of the present invention. Referring to FIG. 30(*a*), a dual programmable wave shaping secondary signal path 900 includes a complex overshoot width control stage 903 followed by a complex overshoot shaping stage 904. Both the shaping and width control stages are provided with programmable bias currents. The complex overshoot shaping stage 904 further functions as an amplitude and width control stage. More specifically, the complex overshoot width control stage 903 has its DC bias current set by a programmable current source 905 controlled by the DC programming signal PG1. The complex overshoot shaping stage 904 has its DC bias current set by a programmable current source 906 controlled by the DC programming signal PG2.

Referring to FIG. 30(*b*), a dual programmable wave shaping secondary signal path 950 includes a complex overshoot shaping stage 953 followed by a complex overshoot amplitude control stage 954. Both the shaping and width control stages are provided with programmable bias currents. The complex overshoot shaping stage 953 further functions as an amplitude control stage. More specifically, the complex overshoot shaping stage 953 has its DC bias current set by a programmable current source 955 controlled by the DC programming signal PG1. The complex overshoot amplitude control stage 954 has its DC bias current set by a programmable current source 956 controlled by the DC programming signal PG2.

In some embodiments, dual programmable wave shaping secondary signal path 900 is implemented in the same manner as signal path 550*b* in FIG. 22 but with small bias current or large input swing to the shaping stage.

In some embodiments, dual programmable wave shaping secondary signal path 950 is implemented in the same manner as signal path 127 of FIG. 12 but with bias current I37 and I38 being programmable and with small bias current or large input swing to the shaping stage.

In some embodiments, secondary signal paths 900, 950 generate a complex overshoot signal as shown in FIG. 30(*c*) and FIG. 30(*d*). The complex overshoot signal includes a fast transition to the maximum adjustable amplitude and then a flat region with adjustable width with a decaying exponential waveform following, as shown in FIGS. 30(*c*) and 30(*d*). The width of the complex overshoot signal refers to the width of the flat region (FIG. 30(*c*)) and the width can be varied by the width control stage of the signal path. The amplitude (FIG. 30(*d*)) of the complex overshoot signal can be varied by the amplitude or the amplitude and width control stage of the signal path.

Referring to FIG. 22, in the wave shaping secondary signal path 550*b*, transistors Q39 and Q40 can become momentarily turned off after a Vin transition under certain biasing conditions. In particular, the switching off of transistors Q39 and Q40 occurs when the magnitude of the input signal to the shaping stage (transistors Q39 and Q40) becomes large or when the bias currents I25 and I26 become small. In the dual programmable secondary signal path 550*b*, the shaping stage input swing becomes programmable through the bias current I23 to the scaling stage (transistors Q37, Q42). The bias currents I25 and I26 also become programmable and can be set to a small value to cause transistors Q39 and Q40 to be turned off. In that case, the signal path will generate the complex overshoot signal having a flat top region before the exponential decay.

Under the large input swing or small bias current operating condition, the bias current I23, controlled by programming signal VP1, controls the width of the flat top region of the complex overshoot signal while the bias current I25 and I26, controlled by programming signal VP2, controls both the amplitude and the width of the complex overshoot signal.

In general, the dual programmable wave shaping secondary signal paths described above can be operated in two modes. In a first mode, the shaping stage bias current is large enough to cause the shaping stage transistors to remain turned on. The secondary signal path thus generates an exponential decay overshoot waveform (FIG. 21(*e*)). In a second mode, the shaping stage bias current is small enough or the shaping stage input swing is large enough to cause the shaping stage transistors to momentarily turn off. In that case, the secondary signal path thus generates a complex overshoot waveform (FIG. 30(*c*) and (*d*)).

In the above described embodiments, the transmission line pre-emphasis circuit of the present invention is described as being constructed using bipolar transistors. In other embodiments, the transmission line pre-emphasis circuit of the present invention can be constructed using other semiconductor technologies, such as using MOS, CMOS, JFET and MESFET device technologies.

Furthermore, in the above described embodiments, the bias currents driving the gain or scaling stages of the primary or secondary signal paths are shown to be programmable. In other embodiments, one or more of the bias currents may be fixed or programmable. When the bias current is fixed, the transient response will become fixed. When a bias current controlling amplitude is programmable, relative proportions of the transient response from that secondary signal path can be selected to give the desired transient response in the output voltage signal of the pre-emphasis circuit. In the dual programmable signal path implementations, the bias current to the shaping stage can be adjusted by itself or in combination with the scaling stage bias current in that secondary path to also vary the timing parameters of the overshoot pulse, such as the pulse width.

In the above described embodiments, various implementations of the transmission line pre-emphasis are shown as being implemented as differential circuits. One of ordinary skill in the art would appreciate that the differential circuits described herein may be employed in single-ended applications. More specifically, the transmission line pre-emphasis circuits described herein can be configured for single-ended input signals by connecting the single ended signal to one digital input terminal and connecting the other digital input terminal to a fixed voltage with a value between the high and low signal levels. The use of differential input and output signal in the above description is illustrative only.

The above detailed descriptions are provided to illustrate specific embodiments of the present invention and are not intended to be limiting. Numerous modifications and variations within the scope of the present invention are possible. The present invention is defined by the appended claims.

I claim:

1. A transmission line pre-emphasis circuit, comprising:

a primary signal path coupled to receive a digital data stream to be transmitted and provide a primary differential output current indicative of the digital data stream;

one or more secondary signal paths each incorporating a network implementing a specific transient response, the one or more secondary signal paths receiving the digital data stream and generating secondary differential output currents representing one or more overshoot signals indicative of the transient response of the respective network and synchronized with transitions of the digital data stream, the one or more secondary signal paths receiving a pair of programmable bias currents that vary an amplitude and/or a width of the one or more overshoot signals, the differential secondary output currents being summed with the primary differential output current of the primary signal path; and an output loading stage coupled to receive the summed differential output current to generate a pre-emphasized digital output signal to be transmitted onto a transmission line indicative of the one or more overshoot signals added to and synchronized with transitions of the digital data stream.

2. The transmission line pre-emphasis circuit of claim 1, wherein the primary signal path has a programmable bias current programmed through a DC programming signal.

3. The transmission line pre-emphasis circuit of claim 1, wherein the primary signal path comprises:

a differential digital driver receiving the digital data stream and generating output signals indicative of the digital data stream with a given delay; and a current switch receiving the output signals from the differential digital driver and driving the primary differential output current indicative of the digital data stream with the given delay.

4. The transmission line pre-emphasis circuit of claim 3, wherein the differential digital driver comprises a digital buffer and the current switch is implemented as a saturating differential transconductance amplifier.

5. The transmission line pre-emphasis circuit of claim 4, wherein the current switch is implemented as a saturating differential transconductance amplifier with a programmable DC bias current programmed through a DC programming signal.

6. The transmission line pre-emphasis circuit of claim 3, wherein the given delay provided by the differential digital driver matches a delay of the overshoot signals through the one or more secondary signal paths.

7. The transmission line pre-emphasis circuit of claim 1, wherein the one or more secondary signal paths each realizes a unique transient response selected from one of a decaying exponential with a given time constant and an overshoot pulse.

8. The transmission line pre-emphasis circuit of claim 1, wherein the one or more secondary signal paths each incorporating a network implemented using one of a capacitor or a serially-connected resistor and capacitor.

9. The transmission line pre-emphasis circuit of claim 1, wherein a first secondary signal path of the one or more secondary signal paths comprises:

a wave shaping stage incorporating a network implementing the specific transient response, the wave shaping stage having a pair of differential input terminals receiving the digital data stream and generating a wave shaping stage differential output current on a pair of differential output nodes, the wave shaping stage differential output current having a transient response indicative of a voltage of the digital data stream being applied to the network, the wave shaping stage having a variable bias current set by a first DC programming signal; and a scaling stage having a pair of differential input terminals receiving the wave shaping stage differential output current and a pair of differential output terminals generating the secondary differential output current, the scaling stage having a variable bias current being set by a second DC programming signal, wherein the overshoot signal indicative of the secondary differential output current has a variable amplitude modified by the second DC programming signal of the scaling stage.

10. The transmission line pre-emphasis circuit of claim 9, wherein the first secondary signal path incorporates a network implemented using a serially-connected resistor and capacitor.

11. The transmission line pre-emphasis circuit of claim 10, wherein the first secondary signal path generates an overshoot signal being a decaying exponential with a given time constant.

12. The transmission line pre-emphasis circuit of claim 10, wherein the first secondary signal path generates a complex overshoot signal with a peak amplitude region and a decaying exponential region when the variable bias current to the wave shaping stage set by the first DC programming signal is set to a small value, the width of the peak amplitude region of the complex overshoot signal being modified by the first DC programming signal.

13. The transmission line pre-emphasis circuit of claim 1, wherein a second secondary signal path of the one or more secondary signal paths comprises:

a scaling stage having a pair of differential input terminals receiving the digital data stream and a pair of differential output terminals generating a scaling stage differential output voltage, the scaling stage having a variable bias current being set by a first DC programming signal, the scaling stage differential output voltage being indicative of a voltage signal representative of the digital data stream; and a wave shaping stage incorporating a network implementing the specific transient response, the wave shaping stage having a pair of differential input terminals receiving the scaling stage differential output voltage and generating the secondary differential output current, the secondary differential output current having a transient response indicative of a voltage of the digital data stream being applied to the network, the wave shaping stage having a variable bias current set by a second DC programming signal.

14. The transmission line pre-emphasis circuit of claim 13, wherein the second secondary signal path incorporates a network implemented using a serially-connected resistor and capacitor.

15. The transmission line pre-emphasis circuit of claim 13, wherein the second secondary signal path generates an overshoot signal being a decaying exponential with a given time constant, where the overshoot signal has a variable amplitude modified by the first DC programming signal of the scaling stage.

16. The transmission line pre-emphasis circuit of claim 13, wherein the second secondary signal path generates a complex overshoot signal with a peak amplitude region and a decaying exponential region when the variable bias current to the wave shaping stage set by the first DC programming signal is set to a small value, the width of the peak amplitude region of the complex overshoot signal being modified by the first and second DC programming signals and the amplitude of the peak amplitude region of the complex overshoot signal being modified by the second DC programming signal.

17. The transmission line pre-emphasis circuit of claim 1, wherein a third secondary signal path of the one or more secondary signal paths comprises:

a pulse shaping stage incorporating a network implementing the specific transient response, the pulse shaping stage having a pair of differential input terminals receiving the digital data stream and generating a pulse shaping stage differential output current on a pair of differential output nodes, the pulse shaping stage differential output current having a transient response being an overshoot pulse, the pulse shaping stage having a variable bias current set by a first DC programming signal; and a scaling stage having a pair of differential input terminals receiving the pulse shaping stage differential output current and a pair of differential output terminals generating the secondary differential output current, the scaling stage having a variable bias current being set by a second DC programming signal, wherein the overshoot signal indicative of the secondary differential output current has a variable amplitude modified by the second DC programming signal of the scaling stage.

18. The transmission line pre-emphasis circuit of claim 17, wherein the third secondary signal path incorporates a network implemented using a capacitor and the overshoot signal comprises an overshoot pulse, the overshoot pulse being summed with the primary differential output current to generate the pre-emphasized digital output signal having the overshoot pulse synchronized with transitions of the digital data stream.

19. The transmission line pre-emphasis circuit of claim 1, wherein a fourth secondary signal path of the one or more secondary signal paths comprises:

a scaling stage having a pair of differential input terminals receiving the digital data stream and a pair of differential output terminals generating a scaling stage differential output voltage, the scaling stage having a variable bias current being set by a first DC programming signal, the scaling stage differential output voltage being indicative of a voltage signal representative of the digital data stream; and a pulse shaping stage incorporating a network implementing the specific transient response, the pulse shaping stage having a pair of differential input terminals receiving the scaling stage differential output voltage and generating the secondary differential output current, the secondary differential output current having a transient response being an overshoot pulse, the pulse shaping stage having a variable bias current set by a second DC programming signal, wherein the overshoot signal indicative of the secondary differential output current has a variable width modified by the first DC programming signal of the scaling stage.

20. The transmission line pre-emphasis circuit of claim 19, wherein the fourth secondary signal path incorporates a network implemented using a capacitor and the overshoot signal comprises an overshoot pulse, the overshoot pulse being summed with the primary differential output current to generate the pre-emphasized digital output signal having the overshoot pulse synchronized with transitions of the digital data stream.

21. The transmission line pre-emphasis circuit of claim 1, wherein the digital data stream and the pre-emphasized digital output signal comprise single-ended signals or differential signals.

22. A method for introducing pre-emphasis to a digital data stream being transmitted over a transmission line, the method comprising:

generating a primary output current indicative of the digital data stream;

applying the digital data stream to one or more networks, each network having a specific transient response;

generating secondary output currents representing one or more overshoot signals indicative of the transient response of the respective network and synchronized with transitions of the digital data stream;

adjusting bias currents of each secondary output current through a pair of DC programming signals at each of the one or more secondary signal path, the bias currents being adjusted to vary an amplitude and/or a width of the one or more overshoot signals;

summing the primary output current with the secondary output current representing the one or more overshoot signals; and generating a pre-emphasized digital output signal to be transmitted onto a transmission line based on the summed current, the pre-emphasized digital output signal being indicative of the one or more overshoot signals added to the digital data stream.

23. The method of claim 22, further comprising:

adjusting a bias current of the primary output current through a DC programming signal.

24. The method of claim 23, wherein generating a primary output current indicative of the digital data stream comprises generating a primary output current indicative of the digital data stream using a differential digital buffer and adjusting a bias current of the primary output current through a DC programming signal comprises adjusting a DC bias current provided to the differential digital buffer.

25. The method of claim 22, wherein generating secondary output currents representing one or more overshoot signals comprises generating a first overshoot signal being a variable amplitude decaying exponential.

26. The method of claim 22, wherein generating secondary output currents representing one or more overshoot signals comprises generating a second overshoot signal being a variable amplitude and variable width overshoot pulse.

27. The method of claim 22, wherein generating secondary output currents representing one or more overshoot signals comprises generating a third overshoot signal being a complex overshoot signal having a peak amplitude region and a decaying exponential region, the amplitude and the wide of the peak amplitude region being variable.

* * * * *